US011893897B2

(12) United States Patent
Xiang et al.

(10) Patent No.: US 11,893,897 B2
(45) Date of Patent: Feb. 6, 2024

(54) MOVEMENT SPACE INFORMATION PROCESSING SYSTEM, MOVEMENT SPACE INFORMATION PROCESSING METHOD, AND COMMUNICATION DEVICE

(71) Applicant: DENSO CORPORATION, Kariya (JP)

(72) Inventors: Jingyu Xiang, Nisshin (JP); Masataka Hirai, Kariya (JP); Tomohito Terazawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 547 days.

(21) Appl. No.: 17/165,323

(22) Filed: Feb. 2, 2021

(65) Prior Publication Data

US 2021/0225183 A1    Jul. 22, 2021

Related U.S. Application Data

(63) Continuation of application No. PCT/JP2019/029859, filed on Jul. 30, 2019.

(30) Foreign Application Priority Data

Aug. 3, 2018  (JP) ................................ 2018-146358
Jul. 29, 2019  (JP) ................................ 2019-138607

(51) Int. Cl.
*G08G 9/00*        (2006.01)
*H04W 4/029*       (2018.01)
(Continued)

(52) U.S. Cl.
CPC ............. *G08G 9/00* (2013.01); *G06V 20/176* (2022.01); *G06V 20/588* (2022.01); *G08G 1/012* (2013.01);
(Continued)

(58) Field of Classification Search
CPC ............ G08G 9/00; G08G 1/012; G08G 3/00; G08G 5/0013; G08G 1/0112; G08G 1/22;
(Continued)

(56) References Cited

U.S. PATENT DOCUMENTS 8,880,323 B2 *  11/2014  Jain ...................... G08G 1/0104
                                                      702/6
10,801,860 B2 * 10/2020  Dorum ................. G09B 29/106
(Continued)

FOREIGN PATENT DOCUMENTS

DE    102019129612 A1 *  5/2020 ............... G08G 1/01
JP    H11-155182 A       6/1999
(Continued)

*Primary Examiner* — Donald J Wallace
*Assistant Examiner* — Jalal C Coduroglu
(74) *Attorney, Agent, or Firm* — MASCHOFF BRENNAN

(57) ABSTRACT

A movement space information processing system includes moving bodies and an information processing device. The information processing device determines one or more moving bodies that are movably located within a predetermined movement range in the space from the moving bodies, and performs an identification task of identifying, from the determined one or more moving bodies, at least one moving body to accordingly perform a setting task of setting the identified at least one moving body as the at least one representative moving body. At least one moving body identified as the at least one representative moving body acquires an image of the space and extracts, from the image, probe information related to the space. The information processing transmits device The moving-body information item including the probe information and performs development of the spatial information based on the probe information.

14 Claims, 18 Drawing Sheets

(51) Int. Cl.
*G08G 3/00* (2006.01)
*G08G 5/00* (2006.01)
*G08G 1/01* (2006.01)
*H04W 4/40* (2018.01)
*G06V 20/10* (2022.01)
*G06V 20/56* (2022.01)
*G06V 20/58* (2022.01)

(52) U.S. Cl.
CPC ............ *G08G 3/00* (2013.01); *G08G 5/0013* (2013.01); *H04W 4/029* (2018.02); *H04W 4/40* (2018.02); *G06V 20/582* (2022.01); *G06V 20/584* (2022.01)

(58) Field of Classification Search
CPC .... G08G 1/056; G06V 20/176; G06V 20/588; G06V 20/582; G06V 20/584; H04W 4/029; H04W 4/40; G01C 21/3804; G01C 21/3841
See application file for complete search history.

(56) References Cited

U.S. PATENT DOCUMENTS

| | | | | |
|---|---|---|---|---|
| 2004/0054248 A1* | 3/2004 | Kimchy | ............... | A61B 6/4057 600/3 |
| 2010/0174482 A1* | 7/2010 | Sugawara | ................ | G08G 1/01 701/517 |
| 2011/0275364 A1* | 11/2011 | Austin | .................... | H04L 41/06 455/423 |
| 2013/0201316 A1* | 8/2013 | Binder | .................... | H04L 67/12 701/2 |
| 2014/0268167 A1* | 9/2014 | Friedman | .................. | G01J 9/02 356/479 |
| 2017/0008562 A1 | 1/2017 | Shashua et al. | | |
| 2017/0359804 A1* | 12/2017 | Manku | ............... | G08B 13/2491 |
| 2019/0384299 A1* | 12/2019 | Maruyama | ............... | G08G 1/16 |
| 2020/0226926 A1* | 7/2020 | Suzuki | .................. | B60W 30/06 |
| 2020/0294401 A1* | 9/2020 | Kerecsen | .................. | G05D 1/0287 |
| 2021/0225183 A1* | 7/2021 | Xiang | ..................... | G08G 3/00 |

FOREIGN PATENT DOCUMENTS

| | | | | |
|---|---|---|---|---|
| JP | 2001-283373 | A | | 10/2001 |
| JP | 2008027011 | A | * | 2/2008 |
| JP | 2009-182940 | A | | 8/2009 |
| JP | 2009182940 | A | * | 8/2009 |
| JP | 2012-89088 | A | | 5/2012 |
| JP | 2012089088 | A | * | 5/2012 |
| JP | 2012-133726 | A | | 7/2012 |
| JP | 2012133726 | A | * | 7/2012 |
| JP | 2012-173979 | A | | 9/2012 |
| JP | 2012173979 | A | * | 9/2012 |

* cited by examiner

FIG.3

OWN VEHICLE INFORMATION

| VEHICLE ID | IMAGE PROCESSING CAPABILITY | GNSS ACCURACY | CURRENT ROAD SECTION |
|---|---|---|---|
| C1 | A | L1 | R11 |

A : HIGH     L1 : 10 CENTIMETERS
B : NORMAL    L2 : 50 CENTIMETERS
C : LOW      L3 : 1 METER

FIG.5

| VEHICLE ID | IMAGE PROCESSING CAPABILITY | GNSS ACCURACY | CURRENT ROAD SECTION |
|---|---|---|---|
| C1 | A | L1 | R11 |
| C2 | B | L2 | R12 |
| C3 | A | L3 | R11 |
| C7 | C | L1 | R13 |
| C15 | C | L2 | R22 |
| C26 | B | L2 | R23 |
| C31 | A | L4 | R14 |
| | | | |

FIG.6

| ROAD SECTION | MARKING LINE DEVELOPMENT RATIO | PLANIMETRIC FEATURE DEVELOPMENT RATIO |
|---|---|---|
| R11 | 100 | 100 |
| R12 | 50 | 25 |
| R13 | 75 | 50 |
| R14 | 0 | 25 |
| R21 | 25 | 0 |
| R22 | 50 | 50 |
| R23 | 50 | 75 |
| R24 | 100 | 100 |
| R31 | 75 | 50 |
| R32 | 100 | 75 |

| MARKING LINE (WHITE LINE) | DLi(a,x,y,z)1-m |
|---|---|
| DATA 1 | DL1(4,x,y,z)1-m |
| DATA 3 | DL2(1,x,y,z)1-m |
| DATA 3 | DL3(2,x,y,z)1-m |
| DATA 4 | DL4(1,x,y,z)1-m |

| SOLID LINE | a = 1 |
|---|---|
| DASHED LINE | a = 2 |
| BOTTS DOTS | a = 3 |
| ROAD EDGE (ROAD SHOULDER) | a = 4 |
| CHANNELIZING STRIPES | a = 5 |

| PLANIMETRIC FEATURE (LANDMARK) | DCj(b,x,y,z)1-n |
|---|---|
| DATA 5 | DC1(3,x,y,z)1-n |
| DATA 6 | DC2(2,x,y,z)1-n |
| DATA 7 | DC3(1,x,y,z)1-n |

| BILLBOARD | b = 1 |
|---|---|
| TRAFFIC LIGHT | b = 2 |
| ROAD SIGN | b = 3 |
| POLE | b = 4 |
| STOP LINE | b = 5 |
| CROSSWALK | b = 6 |

DEVIATION INFORMATION

| VEHICLE ID | DEVIATION FLAG |
|---|---|
| C1 | Fr=1 |

# MOVEMENT SPACE INFORMATION PROCESSING SYSTEM, MOVEMENT SPACE INFORMATION PROCESSING METHOD, AND COMMUNICATION DEVICE

CROSS-REFERENCE TO RELATED APPLICATION

The present invention is based on and claims the benefit of priority from earlier Japanese Patent Application No. 2018-146358 filed on Aug. 3, 2018 in Japan and Japanese Patent Application No. 2019-138607 filed on Jul. 29, 2019 in Japan, the description of which are incorporated hereby by reference.

BACKGROUND

Technical Field

The present invention relates to a movement space information processing system, a movement space information processing method, and a communication device.

Background Art

In the related art, a technique is known in which, when probe information such as traffic jam information from a plurality of vehicles from which the probe information is to be collected is aggregated in an information center, information from a plurality of vehicles is aggregated in one vehicle, with the collected information transmitted from the vehicle to the information center.

SUMMARY

In the present disclosure, provided is a movement space information processing system as the following.

The movement space information processing system includes a plurality of moving bodies movable in a space; and an information processing device. Each moving body includes: a first communication unit, an image acquisition unit, and a control unit. The information processing device includes a second communication unit, a moving body determination unit, an identification unit, and a development unit configured to: receive probe information probe information related to the space transmitted from at least one representative moving body identified by the identification unit; and perform development of the spatial information based on the probe information. The identification unit is configured to: determine, based on a degree of the development of a content of spatial information including information related to the space related to a predetermined movement range in the space, a representative moving-body ratio of the number of the at least one moving body identified as the at least one representative moving body to a total number of the determined one or more moving bodies that are movably located within the predetermined movement range.

BRIEF DESCRIPTION OF THE DRAWINGS

FIG. 3 is an explanatory diagram illustrating an example of own vehicle information.

FIG. 5 is an explanatory diagram illustrating an example of stored vehicle information.

FIG. 6 is an explanatory diagram illustrating a lane line improvement ratio and a planimetric feature improvement ratio as the accuracy of improvement of a map.

DETAILED DESCRIPTION OF THE PREFERRED EMBODIMENTS

Figure 1:
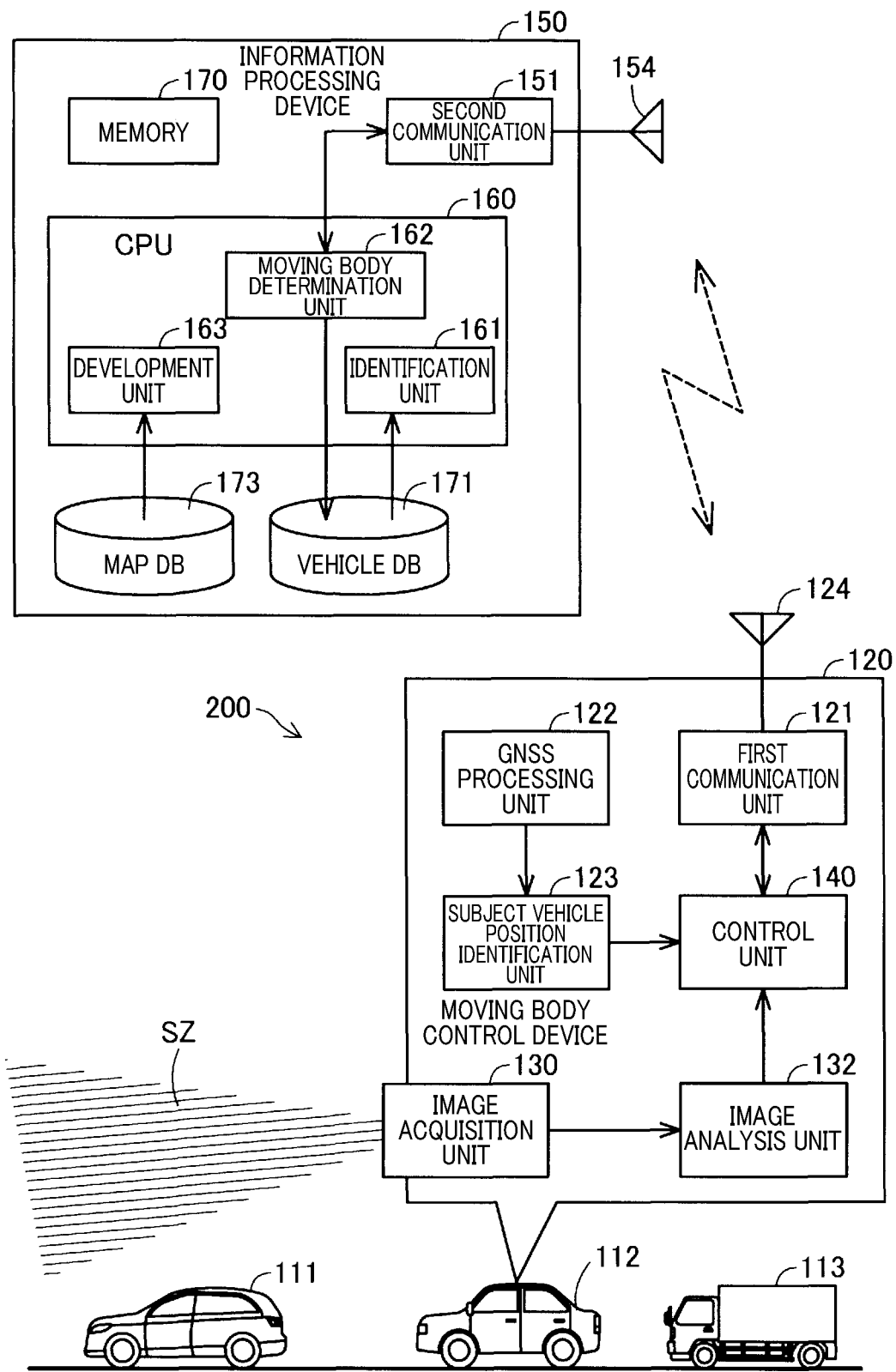
FIG. 1 is a schematic configuration diagram of a movement space information processing system.

A technique for suppressing an increase in processing loads for transmission to the information center due to frequent changes in vehicles intended for information collection, is disclosed. Specifically, a technique in which one vehicle group is set that includes vehicles traveling in the same direction as that in which the own vehicle travels and at a speed equivalent to that at which the own vehicle travels and in which information regarding the vehicles included in the vehicle group is aggregated in one vehicle, with the aggregated information transmitted to the information center, is disclosed.

Such techniques limit the communication to one vehicle to enable a reduction in data traffic, but fail to flexibly satisfy a demand to obtain information from other vehicles through communication. Additionally, in a case where one vehicle group is set that includes vehicles traveling in the same direction as that in which the own vehicle travels and at a speed equivalent to that at which the own vehicle travels, leaving of the group by existing vehicles and joining to the group by new vehicles may frequently occur, preventing the processing loads from being sufficiently reduced. These problems are not limited to vehicles but may occur with other moving bodies.

The present disclosure includes a movement space information processing system in the following aspects. As a first aspect, a movement space information processing system is provided. The movement space information processing system includes a plurality of moving bodies movable in a space; and an information processing device configured to exchange information with each moving body to thereby create spatial information including information related to the space. In this case, each moving body includes: a first communication unit configured to communicate with the information processing device to exchange a moving-body information item with the information processing device, the moving-body information item including position information regarding a position of the corresponding moving body in the space; an image acquisition unit configured to acquire an image of the space; and a control unit configured to: extract, from the image, probe information related to the space in response to being set as at least one representative moving body by the information processing device; and transmit, to the information processing device, the moving-body information item including the probe information. Additionally, the information processing device includes: a second communication unit configured to perform communications with each moving body; a moving body determination unit configured to: acquire the moving-body information items transmitted from the respective moving bodies using the communications via the second communication unit; and analyze the position information included in each of the moving-body information items to thereby determine, from the moving bodies, one or more moving bodies that are movably located within a predetermined movement range in the space; an identification unit configured to perform an identification task of identifying, from the determined one or more moving bodies, at least one moving body to accordingly perform a setting task of setting the identified at least one moving body as the at least one representative moving body; and a development unit configured to: receive the probe information transmitted from the at least one representative moving body; and perform development of the spatial information based on the probe information. The identification unit being configured to: determine, based on a degree of the development of a content of the spatial information related to the movement range, a representative moving-body ratio of the number of the at least one moving body identified as the at least one representative moving body to a total number of the determined one or more moving bodies that are movably located within the predetermined movement range.

In the movement space information processing system, the spatial information is information related to the space through which a moving body moves and is used to restrict movement of the moving body or guide the movement. If the moving body is a vehicle such as an automobile or a motorcycle, the spatial information corresponds to map information including the state of a road surface on which the vehicle travels. Additionally, if the moving body is a flying body such as a drone, the spatial information is information used to restrict movement of the moving body in a three-dimensional space or guide the movement. Furthermore, a ship or the like can be assumed as an example of the moving body. The moving-body information item is a general term for information transmitted to the information processing device by the moving body. The moving-body information item includes at least information regarding the position of the moving body in space, and for the representative moving body, includes probe information. The probe information is acquired from the image and is information relates to the space. If the moving body is a vehicle, the spatial information includes static information on marking lines on roads and planimetric features. Additionally, if the moving body may be a ship, the spatial information includes static information of reefs and waterway ends and the like, and if the moving body is a drone, the spatial information includes static information of steel towers, electric wires, and bumps and dips on land portions and the like.

The movement space information processing system sets, as a representative moving body, at least one of the moving bodies moving within the predetermined moving range in the space, and uses the probe information received from the representative moving body to improve the spatial information such as map information. Setting the representative moving body allows adjustment of data traffic from the moving body communicating with the information processing device and improvement of the spatial information using the probe information.

A. First Embodiment

A-1. System Configuration

As illustrated in a system configuration diagram in FIG. 1, a movement space information processing system 200 obtains probe information from traveling vehicles 111, 112, 113, and the like corresponding to a type of moving bodies, and improve spatial information regarding a space through which the vehicle travels, in this case, road map information. The movement space information processing system 200 includes a moving body control device 120 mounted to each vehicle and an information processing device 150 receiving information from each vehicle and improving map information.

Each of the vehicles 111, 112, 113, and the like includes the moving body control device 120. The moving body control device 120 mounted in the vehicle 112 will hereinafter be described by way of example. The moving body control device 120 includes a first communication unit 121 communicating with the information processing device 150 via an antenna 124, a GNSS processing unit 122 processing signals from a plurality of navigation satellites, a own vehicle position identification unit 123 receiving signals from the GNSS processing unit 122 to identify the own vehicle position, an image acquisition unit 130 such as a video camera that captures an image of at least a region SZ in front of the vehicle 112, an image analysis unit 132 analyzing the image acquired by the image acquisition unit 130 to extract probe information described below, a control unit 140 performing overall control of the moving body control device 120, and the like. Each of the vehicles 111, 112, 113, and the like is equipped with the moving body control device 120 as described above. However, the functions of the moving body control device 120 need not necessarily be identical: for example, the communication function of the first communication unit 121 and the position identification accuracy of the GNSS processing unit 122, or the analysis capability of the image acquisition unit 130 may be different.

The control unit 140 acquires, at predetermined intervals, the own vehicle position identified by the own vehicle position identification unit 123, and uses the first communication unit 121 to periodically transmit the own vehicle position to the information processing device 150. Additionally, when the control unit 140 receives a designation of a representative vehicle from the information processing device 150, the control unit 140 transmits, to the information processing device 150 at predetermined intervals, probe information extracted by the image acquisition unit 132 by analyzing an image of the region SZ in front of the vehicle 112. In a case where the probe information is transmitted as well, the own vehicle position identified by the own vehicle position identification unit 123 is transmitted with the probe information. Additionally, regardless of whether the transmission includes only the own vehicle position or both the own vehicle position and the probe information, the first communication unit 121 is used for the transmission. Of course, different communication units may be used for two sessions of communication. For example, for only the own vehicle position, a 3G or 4G communication network may be used, whereas, for both the own vehicle position and the probe information, a 5G communication network may be used. Information on the vehicle corresponding to a moving body, which is transmitted via the first communication unit 121, corresponds to moving-body information item. All of the vehicles 111, 112, and 113 constantly transmit the moving-body information item to the information processing device 150 at predetermined intervals, and the moving-body information item normally includes information regarding the own vehicle position and in particular cases also includes the probe information corresponding to information related to roads on which the vehicles travel. The probe information will be described below in detail.

The information processing device 150 receives vehicle-side information corresponding to the moving-body information item from a large number of vehicles 111, 112, 113, and the like at predetermined intervals. Thus, the information processing device 150 may hereinafter simply be referred to as the center 150 of the movement space information processing system 200 when the information processing device 150 is referred to in association with a relationship with the vehicle. Additionally, in the present embodiment, the movement space information processing system 200 utilizes the probe information from a large number of vehicles to improve map information, and may thus be simply referred to as a map improvement system 200.

As illustrated in FIG. 1, the information processing device 150 includes a second communication unit 151 communicating with each of the vehicles via an antenna 154, a CPU 160 performing, via the second communication unit 151, various types of control such as identification of the vehicles, a memory 170 storing data and programs used by the CPU 160 to operate, an external storage device 171 storing a vehicle database (hereinafter referred to as the vehicle DB) in which information regarding the vehicles for information exchanging is aggregated, an external storage device 172 storing a map database (map DB) that is also to be improved, and the like. The memory 170 generally includes a semiconductor memory. The external storage devices 171 and 172 may each be a semiconductor memory, a magnetic storage medium such as a hard disk, or a fusion drive including a combination of a semiconductor memory and a magnetic storage medium. Furthermore, the vehicle DB and the map DB may be saved in what is called a cloud. Additionally, the databases need not be collectively saved but may be divided into parts for saving as necessary in terms of capacity, security, and the like.

The CPU 160 executes the programs stored in the memory 170 to implement various functions. For implementing the functions, the CPU 160 of the present embodiment include a moving body determination unit 162 aggregating, via the second communication unit 151, the moving-body information item from the vehicles 111, 112, 113, and the like to determine the traveling vehicles and registering the vehicles in the vehicle DB, an identification unit 161 identifying those of the vehicles registered in the vehicle DB which satisfy a particular condition, an improvement section 163 improving the map information saved in the map DB, and the like. In the present embodiment, the image analysis unit 132 analyzes the image acquired by the image acquisition unit 130 of the vehicles traveling on roads, and the results of the analysis are transmitted to the information processing device (center) 150 as the probe information, to thereby improve the map information. In other words, the map information as used herein is not a simple map as a road map but map information including the positions and types of lanes, the positions and types of landmarks such as traffic lights and road signs, and the contents of the landmarks. Specifically, such map information corresponds to spatial information aggregating information related to a space through which the moving bodies moves.

A-2. Operation of Map Improvement System 200

Figure 2:
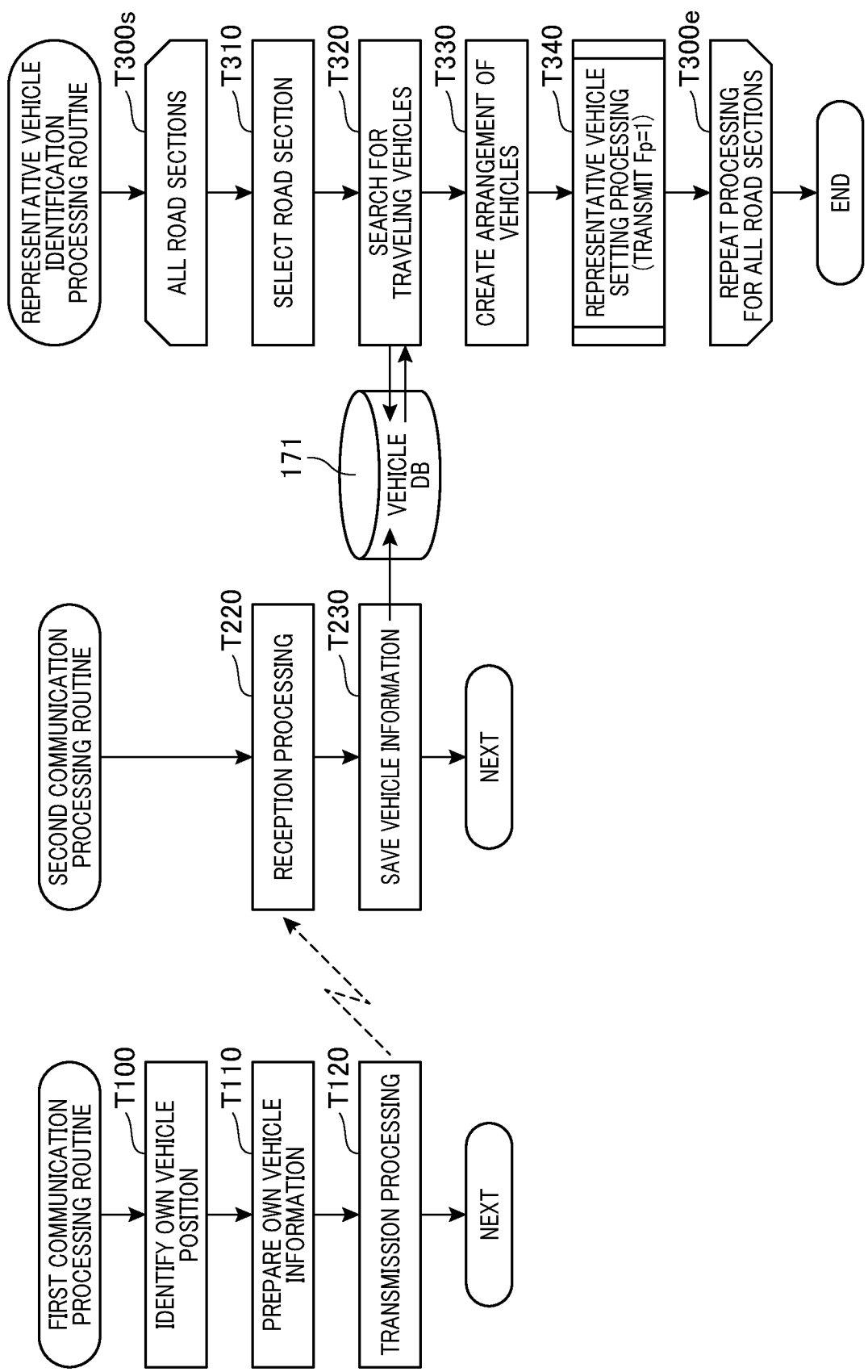
FIG. 2 is a flowchart illustrating basic operation of the movement space information processing system.

FIG. 2 illustrates a list of a plurality of processing routines to illustrate the operation of the map improvement system 200 in an easy-to-understand manner. FIG. 2 describes, on the left side in parallel, a first communication processing routine executed by the moving body control device 120 at predetermined intervals and a second communication processing routine executed by the center 150. To clarify that the vehicle DB to which the vehicle information is written is referenced by the second communication processing routine, a representative vehicle identification processing routine executed by the center 150 is illustrated on the right side across the vehicle DB. These processing routines are repeatedly executed at respective independent timings utilizing interrupt signals generated at predetermined intervals.

The moving body control device 120 in each of the vehicles 111, 112, 113, and the like repeatedly executes, at predetermined intervals, the first communication processing routine illustrated in FIG. 2. When the processing is started, the control unit 140 of the moving body control device 120 first acquires information related to the current own vehicle position from the own vehicle position identification unit 123 and identifies the own vehicle position (step T100). Subsequently, the control unit 140 prepares own vehicle information (step T110). The own vehicle information, an example of which is illustrated in FIG. 3, refers to information such as an own vehicle ID distinguishing the own vehicle from other vehicles, the rank of an image processing capability of the vehicle, a overall position accuracy achieved by the GNSS processing unit 122 and the own vehicle position identification unit 123 mounted in the vehicle, and a road section in which the vehicle is currently traveling. The own vehicle information may further include information on communication capability and the like, and information on the situation of the vehicle (vehicle speed, steering angle, yaw rate, traveling distance, and the like).

The vehicle ID is a unique code assigned to distinguish a vehicle. Each vehicle includes the first communication unit 121 and each communication equipment is assigned a unique MAC address (Media Access Control address), and thus the MAC address may be used as an own vehicle ID. Of course, a unique ID for each vehicle issued by a public organization or the like, such as number plates, may be used.

In FIG. 3, the image processing capability is indicated at three levels: A: high, B: normal, and C: low. The processing capability may be ranked by numerical values such as the number of pixels or voxels that can be processed during one second. In this case, the processing capability may be indicated as an absolute processing capability or as a relative rank within a vehicle group with the same vehicle size class. In FIG. 3, as a GNSS capability, the accuracy with which the vehicle position is identified is illustrated as L1: 10 centimeters, L2: 50 centimeters, and L3: 1 meter. As is the case with the image processing capability, predetermined ranks such as A, B, and C may be used.

Figure 4:
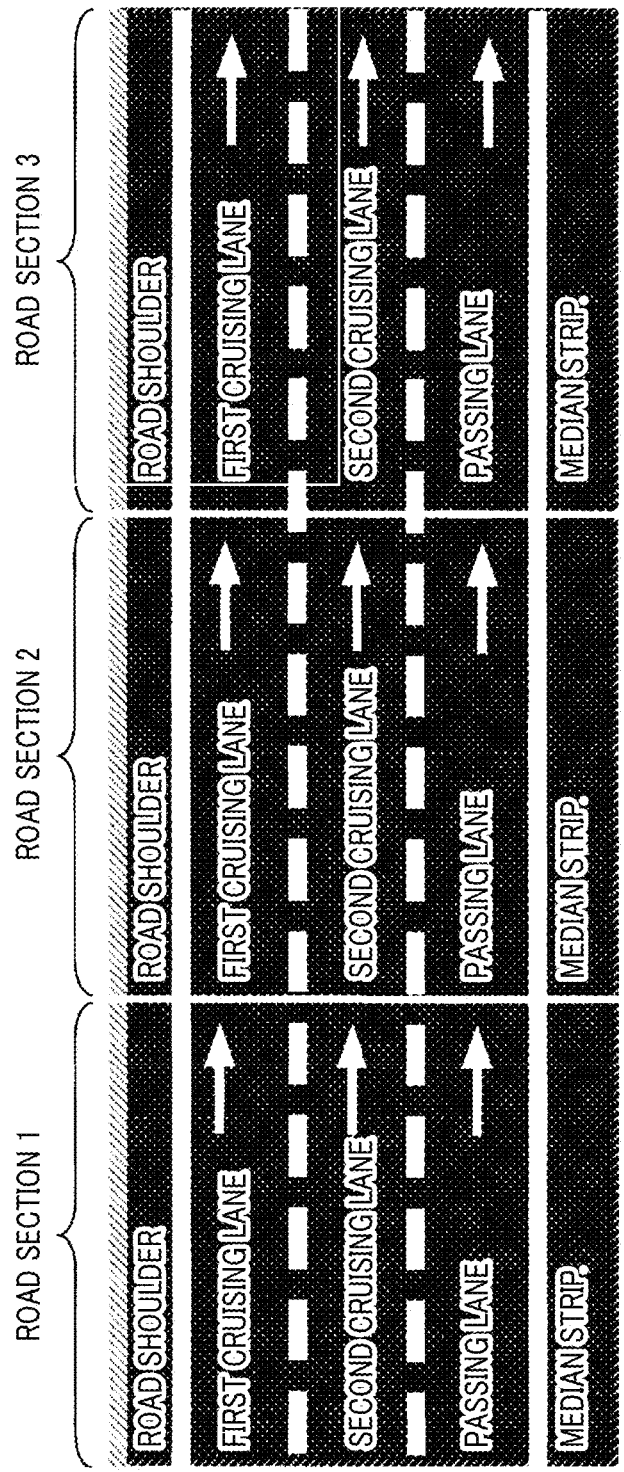
FIG. 4 is an explanatory diagram illustrating an example of a road section.

The current road section included in the own vehicle information is information indicating in which of the road sections prepared in the map the vehicle is traveling. The roads on which the vehicle may travel are pre-assigned, for each predetermined range, unique codes indicating the road sections. In FIG. 3, this is indicated as R11. FIG. 4 illustrates an example of a road section. FIG. 4 illustrates that 3-lane road is divided into road sections 1, 2, and 3. A road section may be a link in a map for road searching in which intersections correspond to nodes and in which portions of roads between the nodes correspond to links. However, since information such as on road signs and billboards is also included in the map, the link may be divided into narrower ranges, which may be used as respective road sections. In the example illustrated in FIG. 4, one road section includes three lanes (first travelling lane, a second travelling lane, and a passing lane), and further includes a median strip and a road shoulder opposite to the median strip. The lanes are separated from one another by dashed center lines, and the median strip side and the road shoulder side are separated from the lanes by solid lines.

In the present embodiment, the same map is intended to be used for the vehicle side and the center side, and the current own vehicle position is intended to be determined by each vehicle and prepared as one piece of moving-body information item. The moving-body information item from a large number of vehicles is constantly transmitted at predetermined intervals, and thus loads imposed on the center 150 side handling the information are not small. Identification of the road section by the vehicle enables a reduction in loads on the center 150. Of course, the vehicle may transmit, to the center 150, the absolute coordinates (latitude, longitude, and altitude) identified by GNSS, and the center 150 may identify the road section. This enables a reduction in loads on the vehicle. Additionally, the configuration of the road sections can be freely changed by the center 150. This facilitates handling a change in road configuration such as opening of a new road or closing a road.

When the own vehicle information described using FIG. 3 as an example has been prepared (FIG. 2, step T110), the control unit 140 of the moving body control device 120 of the vehicle 112 transmits the own vehicle information toward the center 150 (step T120). After the above-described processing, the processing proceeds to NEXT and the present routine is ended temporarily. The above-described first communication processing routine is repeatedly executed at predetermined intervals in each vehicle.

In accordance with the above-described first communication processing executed at the vehicle, the second communication processing routine is executed at the center 150. The second communication processing routine is initiated each time the own vehicle information from each vehicle is transmitted utilizing a signal from the second communication unit 151 as an interrupt signal. In the second communication processing routine, the CPU 160 executes processing for receiving the own vehicle information from the vehicle (step T220), and saves, in the vehicle DB in the external storage device 171, the own vehicle information received from each vehicle (step T230). After the above-described processing, the CPU 160 proceeds to NEXT and ends the processing temporarily. However, each time the own vehicle information is transmitted from another vehicle, the second communication processing is executed.

The CPU 160 of the center 150 repeatedly executes the second communication processing routine to accumulate the own vehicle information from each vehicle in the vehicle DB. An example of this is illustrated in FIG. 5. In FIG. 5, the own vehicle information transmitted from each vehicle is only accumulated on a time-series basis. However, in this case, the vehicle IDs, the current road sections, and the like are assigned indexes. Consequently, vehicles can be easily searched for using the vehicle IDs, and vehicles present in a designated road section can be easily searched. Of course, in the vehicle DB, data may be originally accumulated in a form in which the data is arranged on a road-section-by-road-section basis. When information regarding one vehicle ID is received, whether the vehicle ID is already present in the vehicle DB is checked, and in a case where the vehicle ID is not found, the vehicle ID is newly registered and an index is created. On the other hand, in a case where the vehicle ID is already present in the vehicle DB, the current road section for the vehicle is updated. The image processing capability and the GNSS accuracy are normally determined for each vehicle, and thus, once registered, need not be updated even in a case where the own vehicle information is received again. Of course, in a case where the GNSS accuracy or the like is also changed by the state of reception of an electric wave from a communication satellite, the GNSS or the like may be updated each time such a change occurs. In a case where such an update in the road section or the like is performed, the time of the update may be recorded. In a case where no update is performed for a certain period of time, the vehicle is determined to have stopped traveling (ignition has been turned off), and the vehicle may be deleted from the vehicle DB.

The first communication processing routine executed at the vehicle as described above and the second communication processing routine executed at the vehicle as described above are repeated to collect, in the center 150, the data regarding all the vehicles currently traveling in each road section, and the data is stored in the external storage device 171 as the vehicle DB. In this state, the center 150 executes the representative vehicle identification processing routine illustrated at the right side of FIG. 2. This processing is repeated at predetermined intervals for all the road sections while the center 150 is powered on as illustrated (steps T300s to T300e).

When the representative vehicle identification processing routine illustrated in FIG. 2 is started, the CPU 160 first selects a road section (step T310). The road section may be selected in a pre-registered order or in a random order, or may be sequentially selected from loads with a low ratio map improvement. When the road section is selected, the vehicles traveling in the road section are searched for (step T320). The search for vehicles is completed in a short time in the vehicle DB described above (see FIG. 5) using the road section as an index. When the search for vehicles is complete, an arrangement of the vehicles found is created (step T330). Once the arrangement of the vehicles traveling in the searched road section is created, the representative vehicle identification processing is then executed (step T340). When this processing is complete, a flag Fp indicating a representative vehicle is transmitted to the vehicle set as the representative vehicle. The flag Fp is transmitted after being set to a value of 1 indicating the representative vehicle.

This processing will be described in detail. In the representative vehicle identification processing, first, an improvement status of a map in the road section is checked. The improvement status is the indicator of accuracy of the space information, in other words, the probability of the space information. In the present embodiment, this is referred to as the improvement status, and a state provided with all of the information required for the map is designated as 100%, whereas a state provided with none of the information required for the map is designated as 0%. FIG. 6 illustrates an example. In this example, two improvement rates including a lane line improvement rate and a planimetric feature improvement rate represent a map improvement rate (accuracy) for each road section. In FIG. 6, each improvement rate is indicated in increments of 25% but may be set in smaller increments.

The lane line improvement rate indicates how much information regarding the marking lines in each road section has been prepared. For the road section illustrated in FIG. 4, the marking lines correspond to line data such as dashed lines separating lanes from one another, solid lines indicating separations between the median strip and the lane, and between road shoulder and the lane, and road edges such as the road shoulder and the median strip. Data regarding the marking lines may be utilized for autonomous operation or the like. On the other hand, the planimetric features are objects above ground, and specifically mean those of the objects which are pre-registered as the planimetric features to be contained in the map. The planimetric features may also be referred to as landmarks. In the present embodiment, traffic lights, road signs, billboards, stop lines, and the like are registered as planimetric features. Data regarding the planimetric features can also be utilized for autonomous operation or the like.

Thus, for the road section subjected to the representative vehicle identification processing, the lane line improvement ratio and the planimetric feature improvement rate are referenced to determine the number of representative vehicles as follows, according to the present embodiment.

In a case where the lane line improvement rate and the planimetric feature improvement rate are:
(a) both 100%, one of the traveling vehicles is a representative vehicle,
(b) both 25%, all of the traveling vehicles are representative vehicles, In a case where at least one of the lane line improvement rate and the planimetric feature improvement rate is:
(c) 50% or more and less than 100%, the larger of a quarter or three of the traveling vehicles are representative vehicles, and
(d) 25% or more and less than 50%, the larger of a half or six of the traveling vehicles are representative vehicles.

Consequently, for example, in a case where 10 vehicles are traveling in a certain road section,
one vehicle is a representative vehicle under the condition (a),
three vehicles (2.5<3) are representative vehicles under the condition (c),
six vehicles (5<6) are representative vehicles under the condition (d), and
10 vehicles (all vehicles) are representative vehicles under the condition (b).

Of course, as long as the number of vehicles set as representative vehicle is set to gradually increase with decreasing improvement rate, any setting may be made with no problem. Additionally, in a case where a representative vehicle is set by being selected from a plurality of vehicles traveling in the road section, a higher priority is provided to a vehicle with a higher image processing capability. With no difference in image processing capability, a higher priority is provided to a vehicle with a higher GNSS accuracy. In a case where one representative vehicle is set by using the vehicle DB illustrated in FIG. 5 to select from the vehicles traveling in the road section R11, since the vehicles with the vehicle IDs "C1" and "C3" are traveling in the road section R11 and both have the image processing capability "a", the vehicle with the vehicle ID "C1" is set as a representative vehicle on the basis of the GNSS accuracy. Specifically, the flag Fp set to a value of 1 is transmitted to the set vehicle. Note that the GNSS accuracy may be preferentially used. Alternatively, priorities are provided for setting on the basis of any other capability, for example, a communication capability or the like. The processing described above is repeated for all the road sections. In a case where the processing is repeated for all the road sections, the processing may be repeated from the first road section again.

A-3. Vehicle-Side Information Transmission Processing

Figure 7:
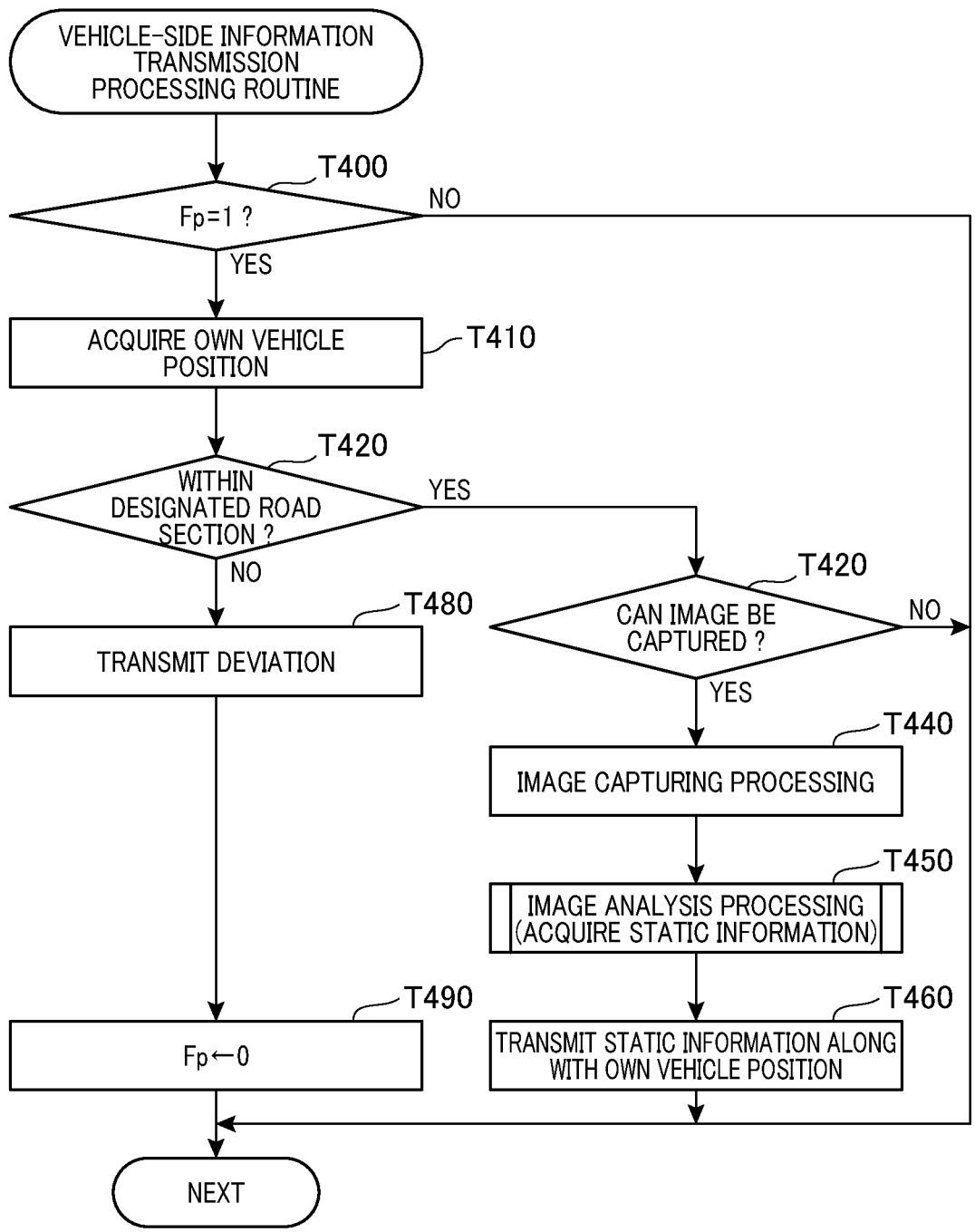
FIG. 7 is a flowchart illustrating a vehicle-side information transmission processing routine executed on a vehicle side.

The above-described processing is executed by the moving body control device 120 and the center 150 to set, of the vehicles traveling in each road section, at least one of the vehicles as a representative vehicle (Fp=1). At this time, the setting of the representative vehicle (Fp=1) and the road section for which the vehicle is set as the representative vehicle are notified to the vehicle. Control at the vehicle subjected to the settings will be described on the basis of a flowchart in FIG. 7. The vehicle-side information transmission processing routine illustrated in FIG. 7 is repeatedly executed on each of the vehicles 111, 112, 113, and the like at predetermined intervals.

When this processing is started, first, the control unit 140 of the moving body control device 120 of the vehicle determines whether the flag Fp stored in the control unit 140 has a value of 1 (step T400). The flag Fp has a value of 0 by default, and in a case where the flag Fp is set for the representative vehicle by the center 150, data transmitted from the center 150 sets the flag Fp of the vehicle to a value of 1. In a case where the flag Fp does not have a value of 1, the own vehicle is determined not to be a representative vehicle, and nothing is executed. The processing thus ends. Note that, in this case as well, the vehicle transmits the own vehicle position and the own vehicle information to the center 150 at predetermined intervals as illustrated in FIG. 2. Consequently, when a vehicle which has not been set as a representative vehicle is traveling the vehicle may be set as a representative vehicle at a predetermined timing, due to a change in road section in which the vehicle travels, the situations of other traveling vehicles, or the like.

Thus, at any timing, when the flag Fp of the own vehicle is determined to have a value of 1 (step T400: "YES"), the control unit 140 of the vehicle acquires the own vehicle position from the own vehicle position identification unit 123 (step T410). The control unit 140 determines whether the acquired own vehicle position is within the road section designated by the center 150 (step T420), and in a case where the acquired own vehicle position is within the designated road section, uses the image acquisition unit 130 to determine whether an image can be acquired (step T430). Typically, the representative vehicle analyzes the image captured using the image acquisition unit 130 and transmits information resulting from the analysis to the center 150 as probe information. However, for example, when the image acquisition unit 130 is defective due to such as heavy rainfall, snowfall, and fog or fog touching the ground, or the like, even if images can be captured by the vehicles 111, 112, 113, and the like, there is a high possibility that significant data can be not obtained from the images. Thus, whether the vehicle is in such a situation is determined. Note that meteorological conditions such as rainfall, snowfall, fog, and fog touching the ground can be acquired by the vehicle via the center 150. Additionally, a defect in image acquisition unit 130 and the like may be acquired directly from the image acquisition unit 130 or from a dialog ECU or the like not illustrated.

In a case of determining that image capturing using the image acquisition unit 130 is disabled, the control unit 140 takes no action and proceeds to "NEXT" and temporarily ends the present processing routine. On the other hand, in a case of determining that image capturing is enabled, the control unit 140 then uses the image acquisition unit 130 to execute processing for capturing an image of the region SZ outside the vehicle (step T440). In the image capturing, the image acquisition unit 130 may be driven to acquire one still image or a plurality of still images. Alternatively, a moving image for several seconds may be acquired.

Processing is executed in which the image thus obtained is analyzed by the image analysis unit 132 to acquire probe information (step S450). In this processing, information regarding marking lines and planimetric features is extracted from the image obtained. In the present embodiment, the probe information includes static information described below. The information may include dynamic information such as traffic jam information in addition to the static information. The "static information" as used herein means static information that does not vary with point of time, season, or the like and that relates to road surfaces, planimetric features around roads, and the like. The dynamic information refers to information that varies dynamically with point of time, season, or the like, such as traffic jam information, sunshine, rainfall, and snowfall. In the present embodiment, only the static information is treated as probe information, and the processing will be described below in detail. Once the image is analyzed to acquire static information, processing is executed in which the static information is transmitted to the center 150 along with the own vehicle position (step T460). The own vehicle position and the static information correspond to the moving-body information item (in this case, the vehicle-side information). Subsequently, the processing proceeds to "NEXT", and the present processing routine temporarily ends.

Figure 8:
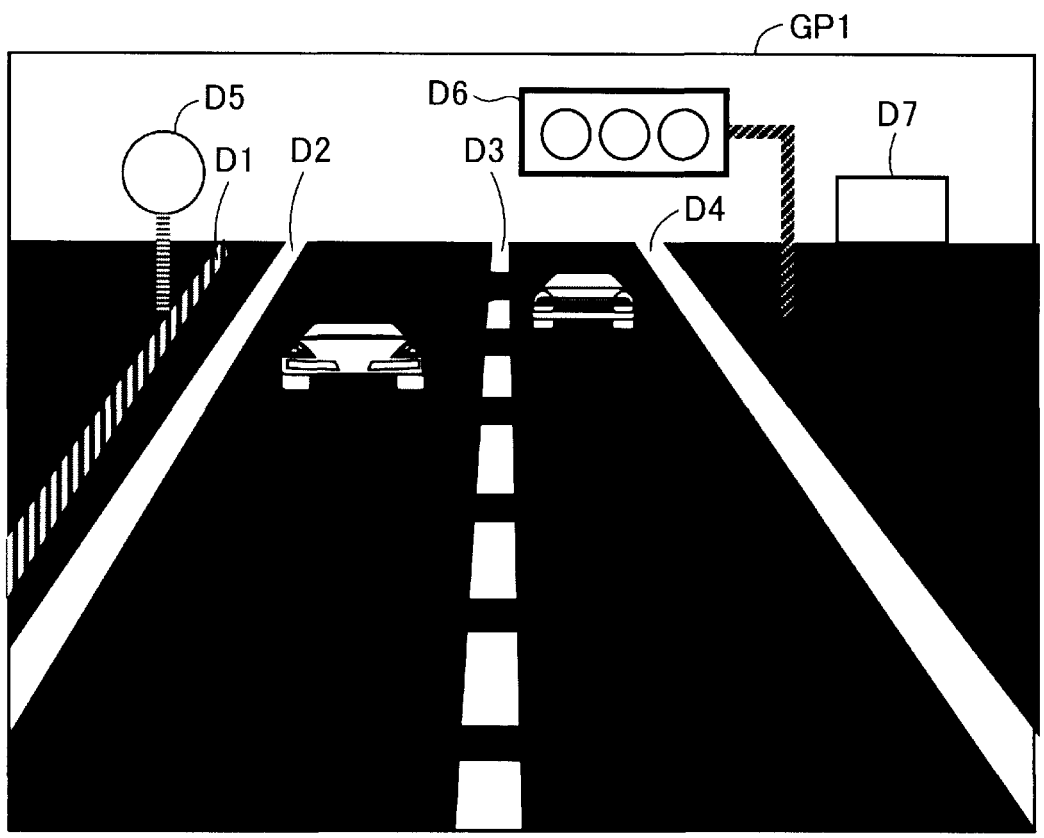
FIG. 8 is an explanatory diagram illustrating an example of an image acquired by an image acquisition unit.

Image analysis processing for acquiring the probe information including the static information will be described by taking an example. FIG. 8 is an explanatory diagram illustrating an image GP1 captured by the vehicle using the image acquisition unit 130. The image GP1 is captured from the traveling vehicle, therefore the image GP1 includes the two preceding vehicles, and marking lines on a road surface and road signs, and the like. The image analysis unit 132 analyzes this image. Before the analysis, binarization, dynamic pattern matching, and the like for the image are used to extract various pieces of information from the image. In the present embodiment, the information regarding marking lines and planimetric features is treated as static information as described below. Here, the marking lines correspond to moving range limitation information indicating information related to the moving range on the road surface on which the vehicle moves. Among the marking lines, for example, lines indicating road edges such as road shoulders indicate that the vehicle is prevented from moving beyond the lines. However, the solid lines and dashed lines between the lanes indicate, in terms of driving rules, whether lane change is enabled.

Figures 9, 10:
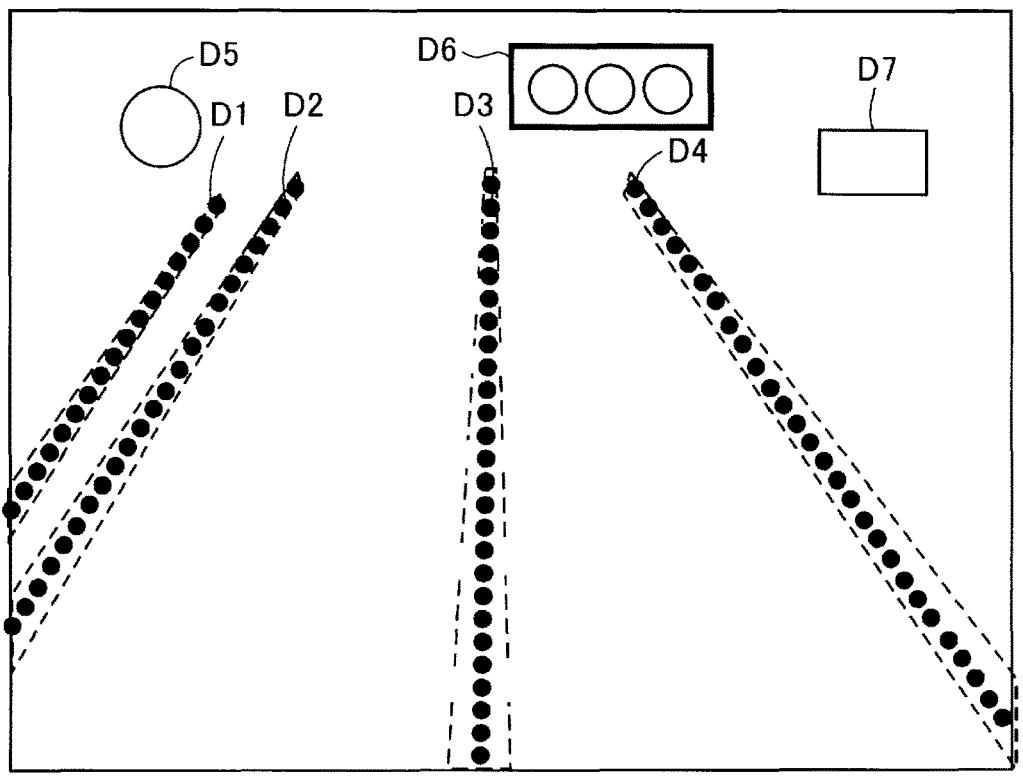
FIG. 9 is an explanatory diagram illustrating an example of probe information extracted from the acquired image.
FIG. 10 is an explanatory diagram illustrating an example of information regarding marking lines corresponding to a type of static information.

The image GP1 contains an image D1 indicating a road shoulder, an image D2 of a solid line provided inward of the road shoulder and indicating a road edge, an image D3 of a dashed line provided between the travelling lanes, an image D4 of a solid line indicating a road edge on the median strip side, an image D5 of a road sign provided near the road shoulder, an image D6 of a traffic light, and an image D7 of a billboard. The image analysis unit 132 analyzes the images to extract data as illustrated in FIG. 9. For convenience of understanding, the same reference signs D1 to D7 are used in FIG. 8 and FIG. 9. However, the image illustrated in FIG. 8 includes analog data (however, the data is binarized) acquired by the image acquisition unit 130 such as a camera, whereas the image illustrated in FIG. 9 is digital data resulting from analysis and extraction.

Marking lines present on the road surface have been converted into a point sequence. The point sequence may be digital data from a set of three-dimensional data (x, y, z). A distance in the depth direction is calculated by analyzing the image, and together with information regarding the own vehicle position identified by the own vehicle position identification unit 123 to thereby obtain the three-dimensional data (x, y, z). The information in the depth direction can be easily calculated by considering the road surface to be a plane if the ground clearance, depression angle, and the like of the image acquisition unit 130 are known. Of course, gradient data originally included in the map may be utilized to three-dimensionally express the road surface, and three-dimensional data regarding points constituting a segment may be determined from the image.

The image analysis unit 132 simultaneously analyzes whether the segment is a solid line or a dashed line. FIG. 10 illustrates an example of this data. Four segments D1 to D4 illustrated in FIG. 9 are indicated as data 1 to data 4. Each segment is represented as DLi (a, x, y, z)1–m. Here, i corresponds to the number of data, and a corresponds to the type of the segment. As illustrated in the lower stage of FIG. 10, the present embodiment includes the following five types of segments.

solid line: a=1
dashed line: a=2
Botts Dots: a=3
road edge (road shoulder or the like): a=4
channelizing stripes: a=5

Note that the Botts Dots refer to small disks that may be used in the U.S. and the like and that are buried in roads at intervals. Other types of segments may be provided or some of the above-described types of segments may exclusively be provided.

The index 1–m of the data indicates that m points 1 to m are present that constitute the segment. Consequently, for example, data 1 indicating a road shoulder is represented as DL1 (4, x, y, z)1–m. In this example, the data has a fixed length, and in a case where there is no mode data available, NULLS are provided. However, the data may be configured with a variable length. Alternatively, the segment may be defined as vector data joining a start point with an end point instead of a set of dots. In that case, a solid line is expressed as a set of a plurality of polygonal lines, and a dashed line is expressed as a set of a plurality of short straight lines. Consequently, even vector data is treated as a set of a plurality of data in a case where the segment is to be expressed accurately to some degree. However, the segment may be approximated to a small number of straight lines (a minimum of one line). A dashed line may be provided with a certain tag to be distinguished from a solid line. Alternatively, a curve such as a Bezier curve or a spline curve may be used for approximation.

Figures 11, 12:
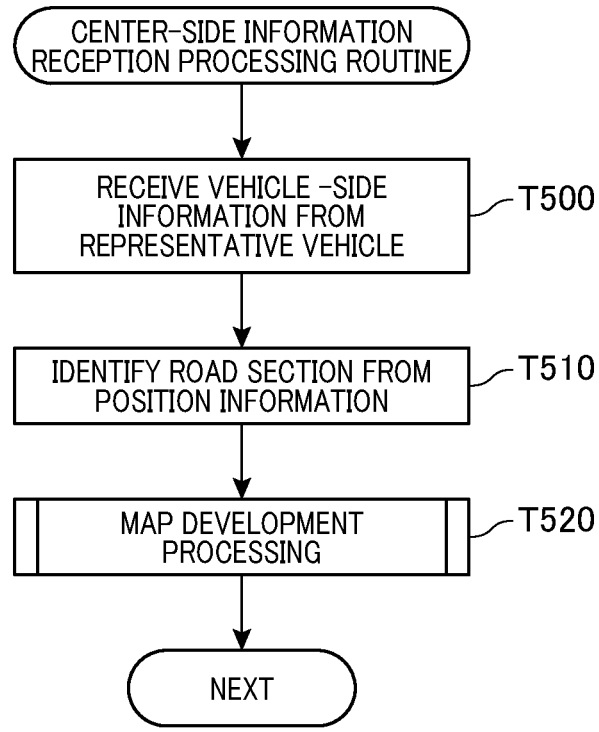
FIG. 11 is an explanatory diagram illustrating an example of information regarding planimetric features also corresponding to a type of static information.
FIG. 12 is a flowchart illustrating an information reception processing routine performed by a center that receives vehicle-side information.

The image captured by the image acquisition unit 130 includes planimetric features. The image analysis unit 132 analyzes pre-registered objects in the image and extracts the objects from the image. As illustrated in FIG. 11, the planimetric features extracted in the embodiment include a billboard, a traffic light, a road sign, a pole, a stop line, a crosswalk, and the like. Of course, more or fewer planimetric features may be registered and extracted. In the example illustrated in FIG. 11, the planimetric features are related to the passage of the vehicle or provided in close proximity to the road, but may include structures such as a bridge, a tunnel, a tollbooth, and a service area, the shapes of the earth's surface and characteristic objects such as a lake or a reservoir, a river, a hill, and a large tree, and the like.

The three planimetric features (road sign, traffic light, and billboard) D5, D6, and D7 illustrated in FIG. 9 are depicted as data 5, 6, and 7 in FIG. 11. Each of the planimetric features is represented as DCj (p, x, y, z)1–n. Here, j corresponds to the number of data, and b corresponds to the type of the planimetric feature. As illustrated in the lower stage of FIG. 11, the present embodiment includes six types of planimetric features:

billboard b=1
traffic light b=2
road sign b=3
pole b=4
stop line b=5
crosswalk b=6

The index 1–n of the data indicates that n data 1–n are present that represent planimetric features. For example, data 5 indicating a road sign is represented as DCJ (3, x, y, z)1–n. Unlike the segment, in the present embodiment, the data format of the planimetric feature is predetermined for each type of planimetric feature. For example, for the road sign, the data format includes the absolute coordinates of a central point, a radius from the center, and the like. Additionally, for the traffic light, the data format includes the absolute coordinates of each of the points of a polygon expressing an outer diameter, the number of traffic lights, the direction of an arrow, and the like. Note that the data may additionally include text data. The text data includes, in a case where the road sign includes numbers or characters, the numbers or characters subjected to character recognition, and for the billboard, characters on the billboard subjected to character recognition, and the like. Note that image data may be directly included. In that case, a compression technique such as JPEG is desirably utilized to compress the image data in order to reduce the burden of data transfer.

In step T460 in FIG. 7 described above, static information including data 1 to 7 illustrated in FIG. 10 and FIG. 11 is transmitted to the center 150 as probe information along with the information regarding the own vehicle position. FIG. 12 illustrates processing in the center 150 receiving the transmission, from the vehicle, of the vehicle-side information including the own vehicle position and the static information.

The center 150 receives the transmission of vehicle-side information including the own vehicle position and the static information from the vehicle which is set to the representative vehicle, and receives the vehicle-side information via the second communication unit 151 (step T500). Subsequently, the road section in which the representative vehicle is traveling is identified from the position of the representative vehicle (step T510). Once the road section can be identified, processing is executed in which the map of the section is improved (step T520). The map is improved by supplementing lacking data to the corresponding road section in the map DB saved in the external storage device 172. The improvement of the map as described above may be performed in real time each time the vehicle-side information is received from the representative vehicle or may be collectively performed through batch processing later, for example, during night-time when the traffic decreases to reduce the burden of communication. Of course, communication with the representative vehicle and accumulation of the vehicle-side information may be separated from the device improving the map DB to allow another device to improve the map. Once the map is improved, the lane line improvement ratio and the planimetric feature improvement ratio calculated for each road section constituting the map are updated as illustrated in FIG. 6.

Figures 13, 14:
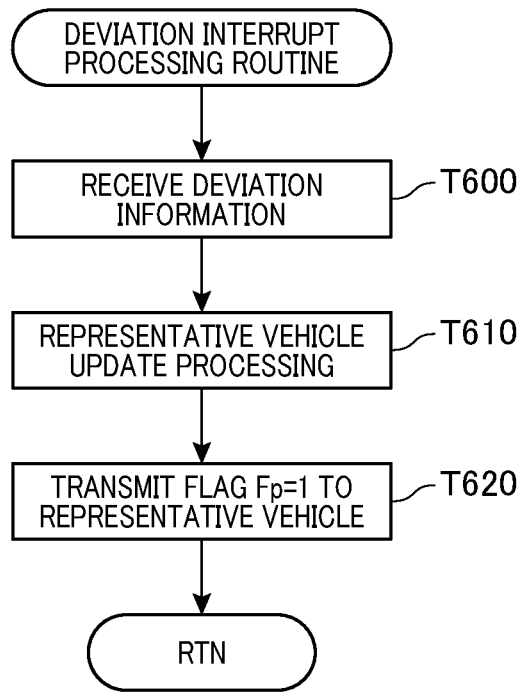
FIG. 13 is an explanatory diagram illustrating an example of deviation information.
FIG. 14 is a flowchart illustrating an example of interruption processing performed by the center having received the deviation information.

The representative vehicle acquires and analyzes an image of the region SZ in front of the vehicle and transmits the vehicle-side information including the own vehicle position and the probe information including the static information obtained by the analysis as described above, and the center 150 receives the vehicle-side information and executes the map improvement processing. While the collection and communication of the information as described above are repeated, the representative vehicle may leave the designated road section. The processing in this case is illustrated after step T420 in FIG. 7. The vehicle acquires the own vehicle position from the own vehicle position identification unit 123, and determines that the road section in which the vehicle is traveling is not within the designated road section (step T420: "NO"). The vehicle then transmits, to the center 150, the deviation of the vehicle from the designated road section (step T480). FIG. 13 illustrates an example of deviation information transmitted. The deviation information includes a vehicle ID indicating the vehicle having left the designated road section and a deviation frag Fr set to a value of 1. Furthermore, the flag Fp saved in the vehicle is reset to a value of 0 (step T490), and proceeds to "NEXT." The present processing routine is then temporarily ended.

The center 150 having received the transmission of the deviation from the representative vehicle executes a deviation interrupt processing routine illustrated in FIG. 14. In the processing, the CPU 160 of the center 150 first receives the deviation information (step T600), identifies the vehicle having left the road section from the vehicle ID included in the deviation information, and executes processing in which the representative vehicle is updated for one or more vehicles traveling in the road section in which the vehicle having left the road section has been included (step T610). The representative vehicle is updated by setting a new representative vehicle by selecting from among the vehicles other than the vehicle having left the road section (in this example, the vehicle with the vehicle ID C1) in the arrangement of vehicles illustrated in FIG. 5. As described above, all the vehicles transmit the own vehicle position to the center 150 at predetermined intervals (FIG. 2: steps T100 to T120), and the center 150 saves the information in the vehicle DB (FIG. 2: step T230) and creates an arrangement of vehicles for each road section (FIG. 2: step T330). Thus, by referencing the arrangement, a vehicle other than the vehicle having left the road section can be easily set as a new representative vehicle.

The center 150 transmits the flag Fp set to a value of 1 to the updated representative vehicle (step T620). Thus, when the representative vehicle leaves the designated road section, a new representative vehicle is set, and the transmission of the vehicle-side information (FIG. 7) and the map improvement (FIG. 12) are continued. In this case as well, as is the case with step S340 in FIG. 2, the representative vehicle is selected from the vehicles traveling in the road section, and vehicles with higher image processing capabilities are first selected, and vehicles with higher GNSS accuracies are then selected. Note that the representative vehicle may repeat deviation and updating for each road section but that a representative vehicle is preset for consecutive road sections in which the vehicle is assumed to travel and only in a case where the representative vehicle deviates from the consecutive road sections, the representative vehicle may transmit data on the "deviation". In the former case, the number of representative vehicles is set for each road section to allow map improvement to be efficiently progressed. In the latter case, the update processing for the representative vehicle need not be frequently executed. In a case where the representative vehicle is set for consecutive road sections, the center 150 may pre-acquire, from the vehicle, a destination during traveling and a route to the destination, and based on those pieces of information, set the representative vehicle for a plurality of road sections. Setting of the representative vehicle based on the destination and the like as described above will be described in the second embodiment in detail. In a case where the vehicle is equipped with a car navigation system or autonomous operation is set, the destination of the vehicle and the traveling route to the destination can be easily transmitted and received.

The processing has been described in which the representative vehicle has deviated from the road section. However, the updating of the representative vehicle as described above is performed in a case where the configuration of the vehicles traveling in a certain road section is varied as well as when the representative vehicle deviates from the road section. For example, the representative vehicle may be updated in a case where a new vehicle enters a certain road section. Particularly in a case where the vehicle having newly joined the arrangement has a high image processing capability or a high GNSS accuracy, and the like, updating of the representative vehicle is effective. Of course, even in a case where the configuration of the vehicles in each road section is changed, changing the setting of the representative vehicle may be avoided during a certain period of time.

The movement space information processing system (map improvement system) 200 of the first embodiment described above can set at least one of the vehicles traveling on the road and utilize, as probe information, the static information including data regarding marking lines and planimetric features obtained from the vehicle to improve the map DB. Furthermore, in that case, the number of vehicles transmitting the probe information as representative vehicles can be set based on the status of map improvement for each road section in the map, and for road sections with low lane line improvement rates and/or low planimetric feature improvement rates, a large number of or a maximum of all the traveling vehicles can be set as representative vehicles to expeditiously collect static information to improve the map. On the other hand, for road sections for which the map has been significantly improved, the number of representative vehicles can be reduced and a minimum of one representative vehicle can be set as a representative vehicle to reduce the data traffic between the vehicle and the center 150 and the amount of processing in the center 150. Thus, map improvement can be progressed in a short time without an excessive increase in data traffic. Note that at least one representative vehicle is set even for a road section with an improvement ratio of 100% and that transmission of static information is received from the representative vehicle in order to check the improved road. Even in a road section for which the map has been temporarily improved, the status of the road may be changed due to construction, disaster, or the like. In a case where such a change in status occurs, the improvement ratio may be reduced, and the map may be re-improved with the number of representative vehicles increased. Note that, instead of the improvement ratio, reporting from road users or a road monitoring technique using a drone or the like may be utilized such that, in a case where the possibility of a variation or abnormality in the status of the road is determined to be higher than a predetermined threshold, the map may be re-improved with the number of representative vehicles increased.

In the embodiment described above, even the vehicles other than the representative vehicle constantly transmit the position of the own vehicle and the capability of the own vehicle to the center 150, allowing the representative vehicle to be easily set and updated. Additionally, the vehicles 111, 112, 113, and the like communicate only with the center 150, preventing an increase in data traffic and avoiding notifying the destination of each vehicle to other vehicles.

In the embodiment described above, while is traveling in a designated road section, the representative vehicle, corresponding to a representative moving body, transmits the probe information to the center 150 in real time. However, an external storage device such as a hard disk may be provided on the vehicle and the probe information may be stored in the external storage device in association with the road section such that, when the vehicle reaches a location such as a wireless LAN environment where high-speed communication is enabled, the probe information is collectively transmitted.

In addition, the probe information may additionally include dynamic information. Additionally, the above-described movement space information processing system 200 may handle a ship or a drone as a moving body. For the ship, no road surface marking lines are present, but edges of waterways and other planimetric features are present. In canals and the like, traffic lights maybe present, and thus a system similar to the above-described movement space information processing system 200 can be utilized. In this case, the static information included in the probe information includes at least one of a billboard, a bridge, a lighthouse, a sign, and a reef as a planimetric feature. Additionally, the moving range limitation information includes at least one of a coastline, revetment, and a pier. Similarly, the movement space information processing system 200 can be applied to a drone, a small airplane, and the like. In this case, the static information included in the probe information includes at least one of a building protruding from ground into the air, a steel tower, a utility pole, an electric wire, a billboard, and a sign as a planimetric feature. Additionally, the moving range limitation information maybe include at least a guidance light indicating a flight path.

B. Second Embodiment

Figure 15:
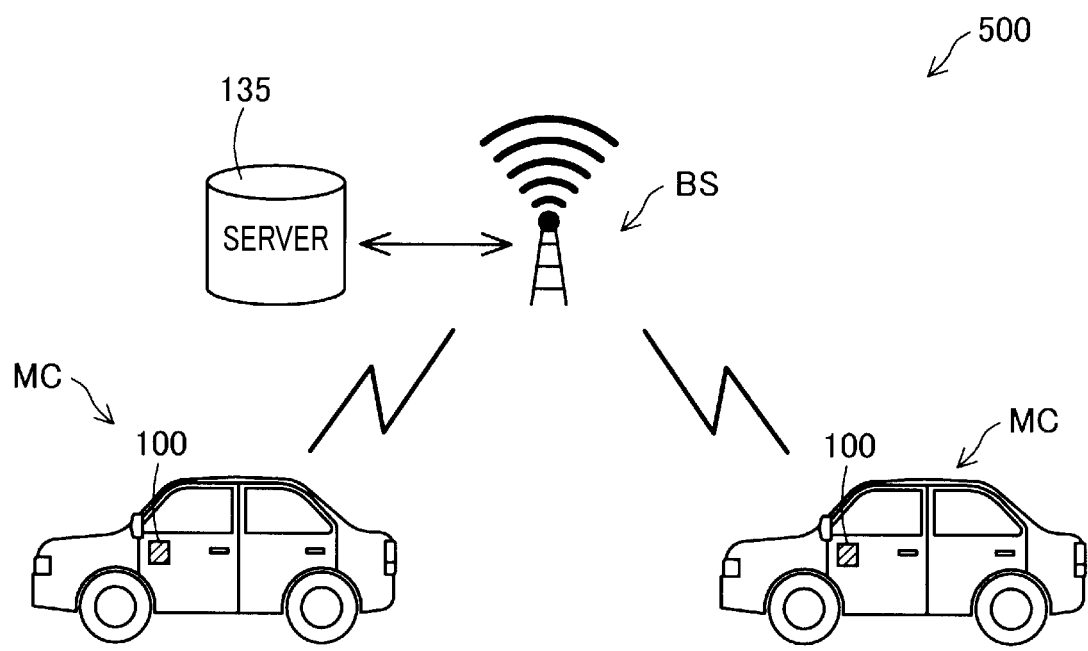
FIG. 15 is a schematic diagram illustrating a configuration of a communication system of the present embodiment.

As illustrated in FIG. 15, a communication system 500 of a second embodiment includes a communication device 100 and a base station BS. The communication device 100 is mounted in a moving body MC. In the present embodiment, a vehicle is used as the moving body MC. However, no such limitation is intended, and the communication device 100 may be mounted in a moving body other than the vehicle, such as a ship or a drone.

The base station BS is a radio station that can communicate with the communication device 100. The base station BS includes a server 135, and the server 135 collects and manages information communicated from the communication device 100. The information managed by the server 135 is used for telematics services for vehicles, the road-vehicle cooperation service, and the vehicle-vehicle cooperation service.

Figure 16:
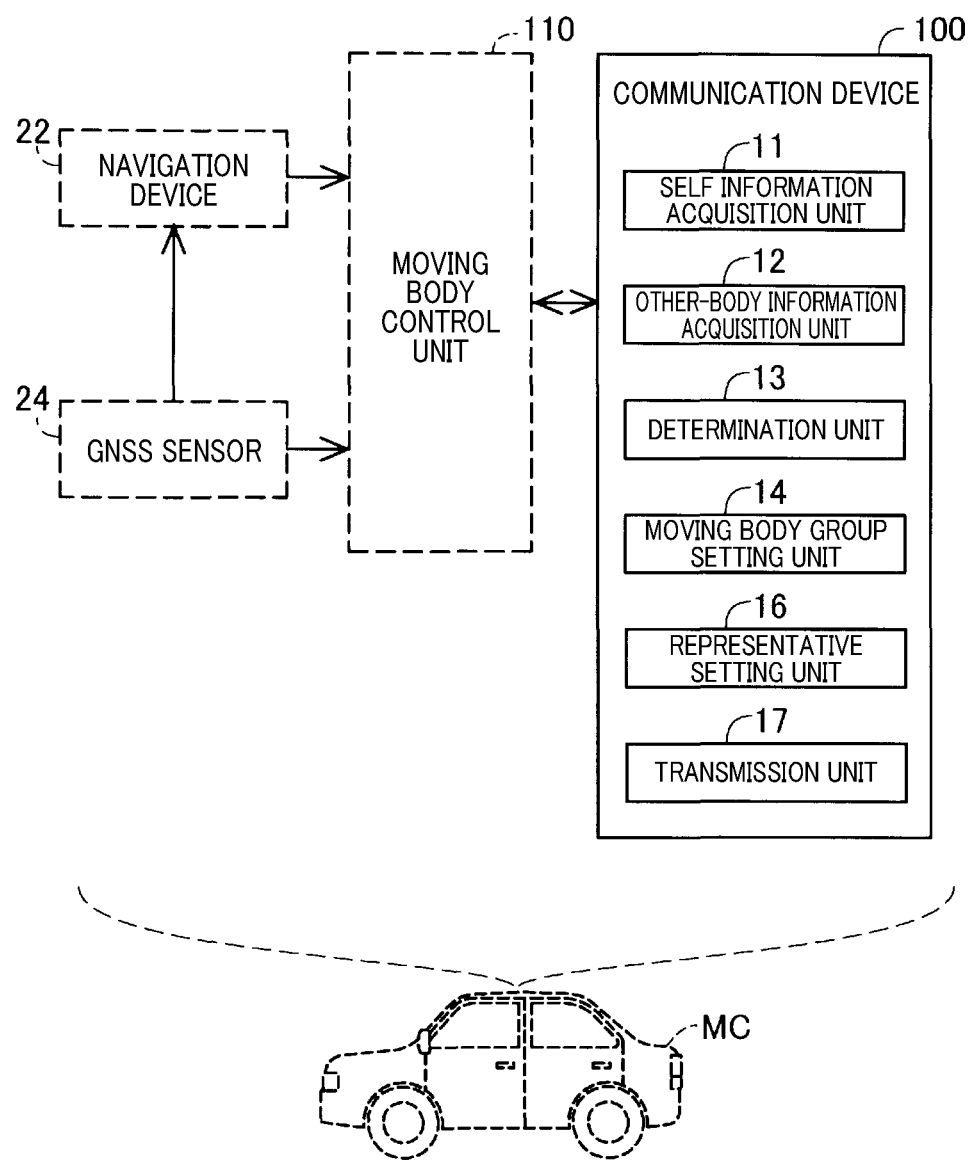
FIG. 16 is a schematic diagram illustrating the configuration of a moving body in which a communication device is mounted.

As illustrated in FIG. 16, besides the communication device 100, the moving body MC includes a moving body control unit 110, a navigation device 22, and a GNSS sensor 24. The moving body control unit 110 is a functional unit controlling the moving body MC and configured as a well-known computer including a CPU and memories such as a ROM and a RAM. The navigation device 22 and the GNSS sensor 24 are electrically connected to the moving body control unit 110, and thus output results from these devices are notified.

The GNSS sensor 24 acquires the current position of the navigation device 22. Specifically, the GNSS sensor 24 measures the current position (longitude and latitude) of the moving body MC based on a navigation signal received from an artificial satellite constituting a GNSS (Global Navigation Satellite System).

The navigation device 22 is a car navigation device performs route searches and route guidance. The navigation device 22 of the present embodiment includes an interface receiving an input from a user of the moving body MC, the interface not being illustrated. An input for a destination is provided from the interface to the navigation device 22, and then the navigation device 22 uses a map built in the navigation device 22 to determine a route to the destination and then perform route guidance. The navigation device 22 is connected to the GNSS sensor 24, and uses, during route guidance, information regarding the current position obtained from the GNSS sensor 24.

The communication device 100 of the present embodiment is electrically connected to the moving body control unit 110 of the moving body MC, and can thus receive various pieces of information regarding the moving body MC from the moving body control unit 110. Note that the connection between the communication device 100 and the moving body MC is not limited to the above-described connection and that connection based on wireless communication may be used. Additionally, a configuration may be such that the communication device 100 is not connected to the moving body MC and that the communication device 100 separately includes the navigation device 22 and the GNSS sensor 24.

The communication device 100 is equipment that can communicate with the base station BS and/or any other communication device. Additionally, the communication device 100 includes, as functional units, a self-information item acquisition unit 11, an other-body information item acquisition unit 12, a determination unit 13, a moving body group setting unit 14, a representative setting unit 16, and a transmission unit 17. The communication device 100 is configured as a well-known computer including a CPU and memories such as a ROM and a RAM, and executes predetermined programs stored in the ROM to implement the functions of the units.

Communication processing of the communication device 100 in the present embodiment will be described below. The communication device 100 first executes joining processing in which the moving body MC equipped with the communication device 100 joins a moving body group. The joining processing is periodically executed (for example, at intervals of 5 minutes) in a case where the moving body MC equipped with the communication device 100 has not joined the moving body group.

Figure 17:
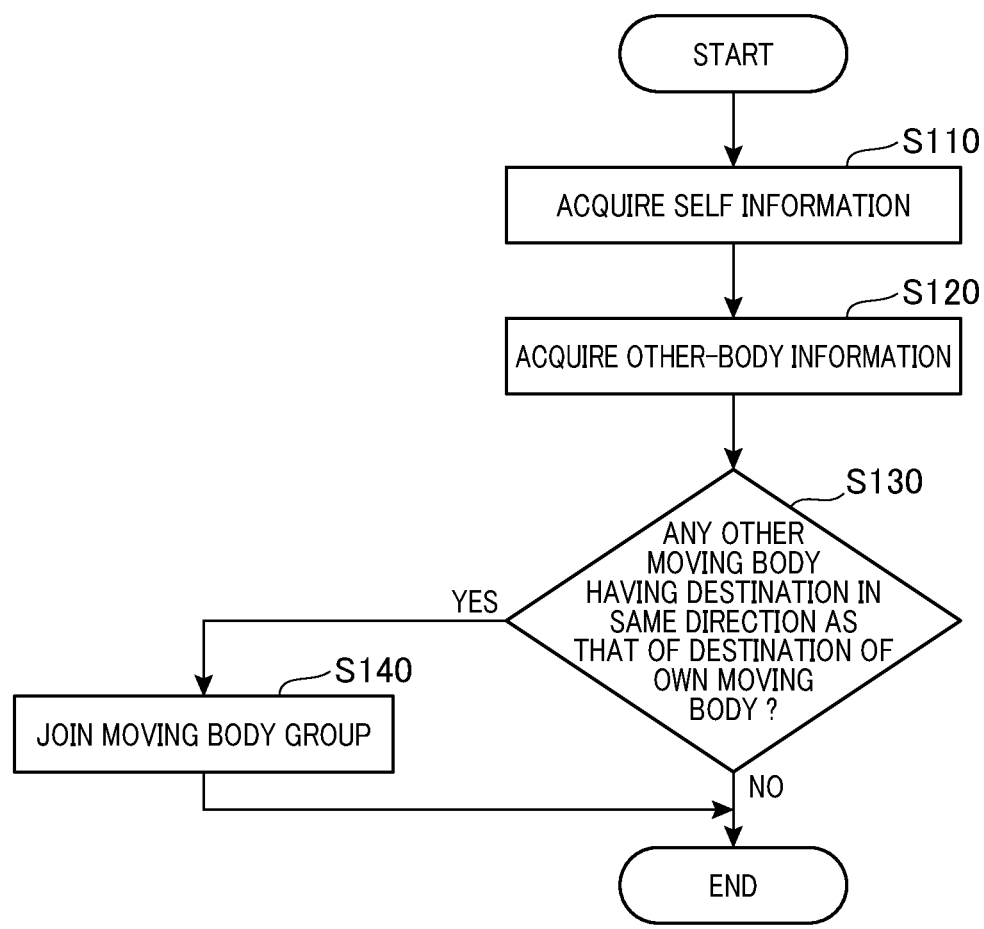
FIG. 17 is a diagram illustrating a flowchart of joining processing in the present embodiment.

As illustrated in FIG. 17, in the joining processing, the communication device 100 first acquires self-information item including a destination of the own moving body (step S110). The functional unit of the communication device 100 in step S110 is a self-information item acquisition unit 11. In the present embodiment, the communication device 100 acquires information regarding the destination and information specific to the moving body MC. In this regard, the information regarding the destination is acquired from the navigation device 22 via the moving body control unit 110. The information specific to the moving body MC is pre-stored in the moving body control unit 110 and acquired from the moving body control unit 110.

Then, the communication device 100 acquires other-body information item including a destination of a corresponding one of the other moving bodies located around the own moving body (for example, within 100 m from the communication device 100) (step S120). The functional unit of the communication device 100 in step S120 is the other-body information item acquisition unit 12. In the present embodiment, the communication device 100 uses the communication function built in the communication device 100 to acquire, as other-body information item, the information regarding the destinations of other moving bodies and the information specific to the other moving bodies. Specifically, the communication device 100 requests other communication devices located around the communication device 100 to transmit other-body information item, and in response to the request, the other communication devices located around the communication device 100 transmit the other-body information item to the communication device 100, thereby the communication device 100 acquires the other-body information item. In this regard, as is the case with the self-information item, the information regarding the destination is acquired from the navigation devices via the moving body control units of the other communication devices. As is the case with the self-information item, the information specific to the other moving bodies is also pre-stored in the moving body control units of the other communication devices and acquired from the moving body control units of the other communication devices.

Then, the communication device 100 uses the self-information item and other-body information item to determine whether any of the other moving bodies has a destination that is identical to the destination of the own moving body MC (step S130). The functional unit of the communication device 100 in step S130 is the determination unit 13. In the present embodiment, the "destination that is identical to the destination of the own moving body MC" refers to the destination being included in the same prefecture as that in which the destination of the own moving body MC is included.

Figure 18:
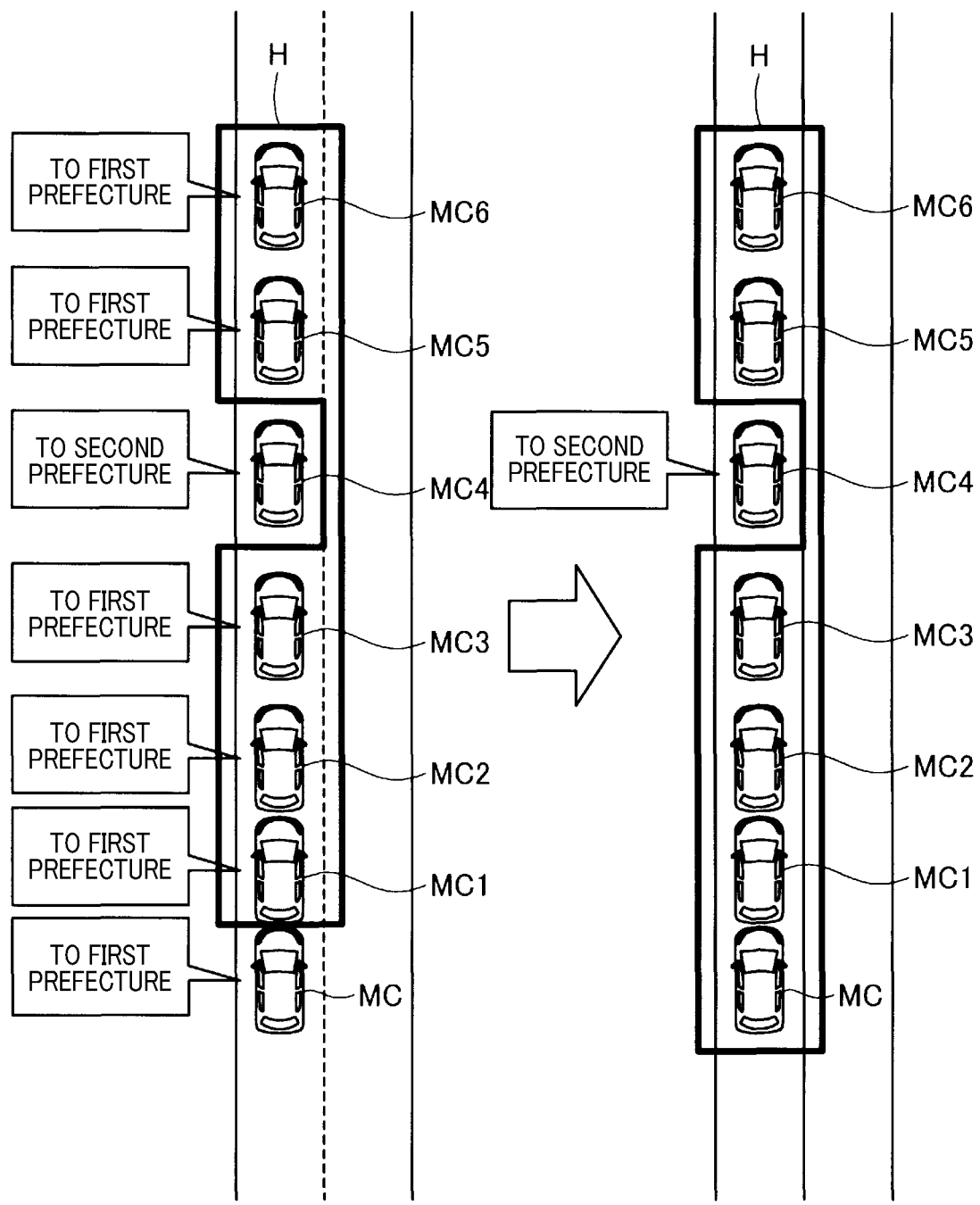
FIG. 18 is a diagram for describing step S130.

FIG. 18 is intended to describe step S130, and describes a plurality of moving bodies and destinations of the respective moving bodies. In FIG. 18, the lowermost moving body in the page of FIG. 18 corresponds to the own moving body MC, and the moving bodies other than the own moving body MC are designated as moving bodies MC1 to MC6 in this order from the bottom of the page of FIG. 18. In this case, for the communication device 100, the own moving body MC has a destination included in a first prefecture. Among the other moving bodies located around the own moving body MC, the moving bodies MC1 to MC3 and MC5 and MC6 have destinations included in the first prefecture. On the other hand, the moving body MC4 has a destination included in a second prefecture.

In a case of determining that any of the other moving bodies have destinations in the same direction as that of the destination of the own moving body MC (step S130: YES), the communication device 100 sets the own moving body and at least one other moving body with the destination that is identical to the destination of the own moving body MC such that the own moving body MC and the other moving bodies belong to the same moving body group (step S140), and ends the process. The functional unit of the communication device 100 in step S140 is the moving body group setting unit 14. In FIG. 18, a moving body group H is formed by, in advance, a plurality of other moving bodies MC1 to MC3 and MC5 and MC6 with the destinations that are identical to the destination of the own moving body MC. Thus, as illustrated on the right of the page of FIG. 18, the own moving body MC is set to belong to the moving body group H. In the present embodiment, the moving bodies included in a moving body group are intended to pre-share, when joining the moving body group, information-specific to the moving bodies included in the moving body group, and the own moving body MC reports the information specific to the own moving body MC to the other moving bodies constituting the moving body group H to belong to the moving body group H. Note that the other moving bodies with the destinations that are identical to the destination of the own moving body MC need not form a moving body group in advance. In other words, even in a case where no moving body group is present around the moving body MC, when another moving body with the destination that is identical to the destination of the own moving body is present, the another moving body and the own moving body MC form a moving body group.

On the other hand, in a case of determining no other moving body with the destination that is identical to the destination of the own moving body is present (step S130: YES), the communication device 100 avoids joining a moving body group and ends the process. The joining processing is repeatedly executed at predetermined intervals (for example, one minute) until the own moving body joins a particular moving body group.

After the own moving body MC executes the joining processing, the communication device 100 executes representative setting processing for setting a representative moving body from a moving body group. The functional unit of the communication device 100 in the representative setting processing is the representative setting unit 16. From the moving body group H including the moving body MC equipped with the communication device 100, the communication device 100 sets the representative moving body representing the moving body group.

In the present embodiment, the representative moving body is set by the communication device 100 having newly joined the moving body group. However, no such limitation is intended, and the representative moving body may be set by the moving body having been set as the representative moving body when the moving body MC equipped with the communication device 100 joins the moving body group. Note that in a case where the own moving body MC and another moving body newly form a moving body group, the communication devices 100 mounted in both moving bodies set the representative moving body in simultaneously.

In the present embodiment, the communication device 100 sets the representative moving body in accordance with comparison between the information-processing capability of the own moving body and that of the at least one other moving body. Specifically, the communication device 100 sets, as a representative moving body, the moving body having the highest excess processing capability among the moving bodies constituting the moving body group. In the present embodiment, the moving body having a high excess processing capability includes the one having the highest processing performance of the CPU constituting the moving body control unit 110 of the moving body and having the largest free space in the memories constituting the moving body control unit 110. In this regard, the processing performance of the CPU is the product of operating frequency and IPC (Instructions Per Clock cycle). However, no such limitation is intended, and for example, the communication device 100 may set, as a representative moving body, one of the moving bodies constituting the moving body group that involves the farthest distance from the current position to the destination. Thereby, it is possible to simplify the method of setting the representative moving body. Additionally, the communication device 100 may set, as a representative moving body, one of the moving bodies constituting the moving body group that has joined the moving body group last. This simplifies a method for setting the representative moving body. In a case where the moving body having joined the moving body group last is set as a representative moving body and the own moving body MC and another moving body newly form a moving body group, the moving body having a destination that is farthest from the current position may be set as a representative.

After the representative moving body is set, the communication device 100 transmits the information specific to the representative moving body, to the other moving bodies constituting the moving body group, and the representative setting processing ends.

Figure 19:
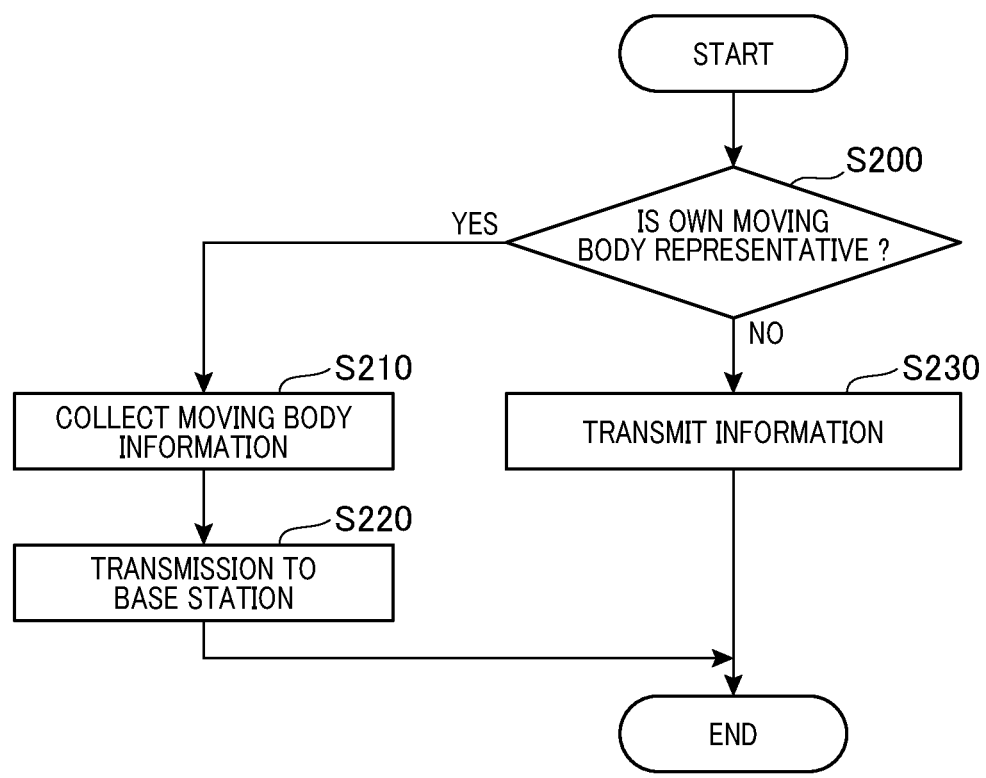
FIG. 19 is a diagram illustrating a flowchart of communication processing in the present embodiment.

After the representative moving body is set, the communication device 100 executes communication processing. The functional unit of the communication device 100 in the communication processing is the transmission unit 17. Specifically, first, the communication device 100 determines whether the own moving body MC is a representative moving body as illustrated in FIG. 19 (step S200). In a case where the own moving body MC is determined to be a representative moving body (step S200: YES), the communication device 100 collects the moving body information to be transmitted to the base station, from the other moving bodies constituting the moving body group to which the own moving body MC belongs (step S210), and transmits the collected information to the base station (step S220). The process then ends. In the present embodiment, the moving body information includes information specific to the moving bodies constituting the moving body group and information regarding the destination.

On the other hand, in a case where the own moving body MC is not set as a representative moving body (step S200: NO), the communication device 100 transmits the self-information item to the moving body set as a representative moving body (step S230), and the process ends.

In the present embodiment, the communication processing is repeatedly executed at predetermined intervals (for example, 10 seconds). In the present embodiment, the information transmitted to the base station BS in the communication processing is used for telematics services for vehicles, the road-vehicle cooperation service, and the vehicle-vehicle cooperation service.

According to the communication device 100 of the present embodiment, the self-information item and the other-body information item are used to allow the own moving body MC and the other moving bodies with the destinations that are identical to the destination of the own moving body MC to be set to belong to the same moving body group H. As a result, the closer the destinations of the moving bodies constituting the moving body group H are to each other, the less moving bodies can deviate from the moving body group H. This reduces the processing during organization of moving body groups, enabling a reduction in processing loads for transmission of information to the base station BS.

Additionally, in the present embodiment, the representative setting unit 16 of the communication device 100 sets, as a representative moving body, the moving body having the highest excess processing capability among the moving bodies constituting the moving body group. Thus, the moving body having the highest excess processing capability transmits information to the base station, allowing transmission of information to the base station to be smoothly performed.

C. Other Embodiments

C1. Other Embodiment 1

In the embodiments described above, the "destination that is identical to the destination of the own moving body MC" refers to a destination included in the same prefecture as that in which the destination of the own moving body MC is included. However, no such limitation is intended. For example, if a point to be reached a predetermined time later (for example, 10 minutes) is located within a predetermined range (for example, within a radius of 1 kilometer), the "destination that is identical to the destination of the own moving body MC" may correspond to the point. In other words, the moving body group setting unit 14 uses the self-information item and the other-body information item to thereby determine that the destination of the at least one other moving body is identical to the destination of the own moving body in a case where a first point where the own moving object will reach after lapse of a predetermined time and a second point where the at least one other moving body will reach after lapse of the predetermined time are located within a predetermined range.

Figure 20:
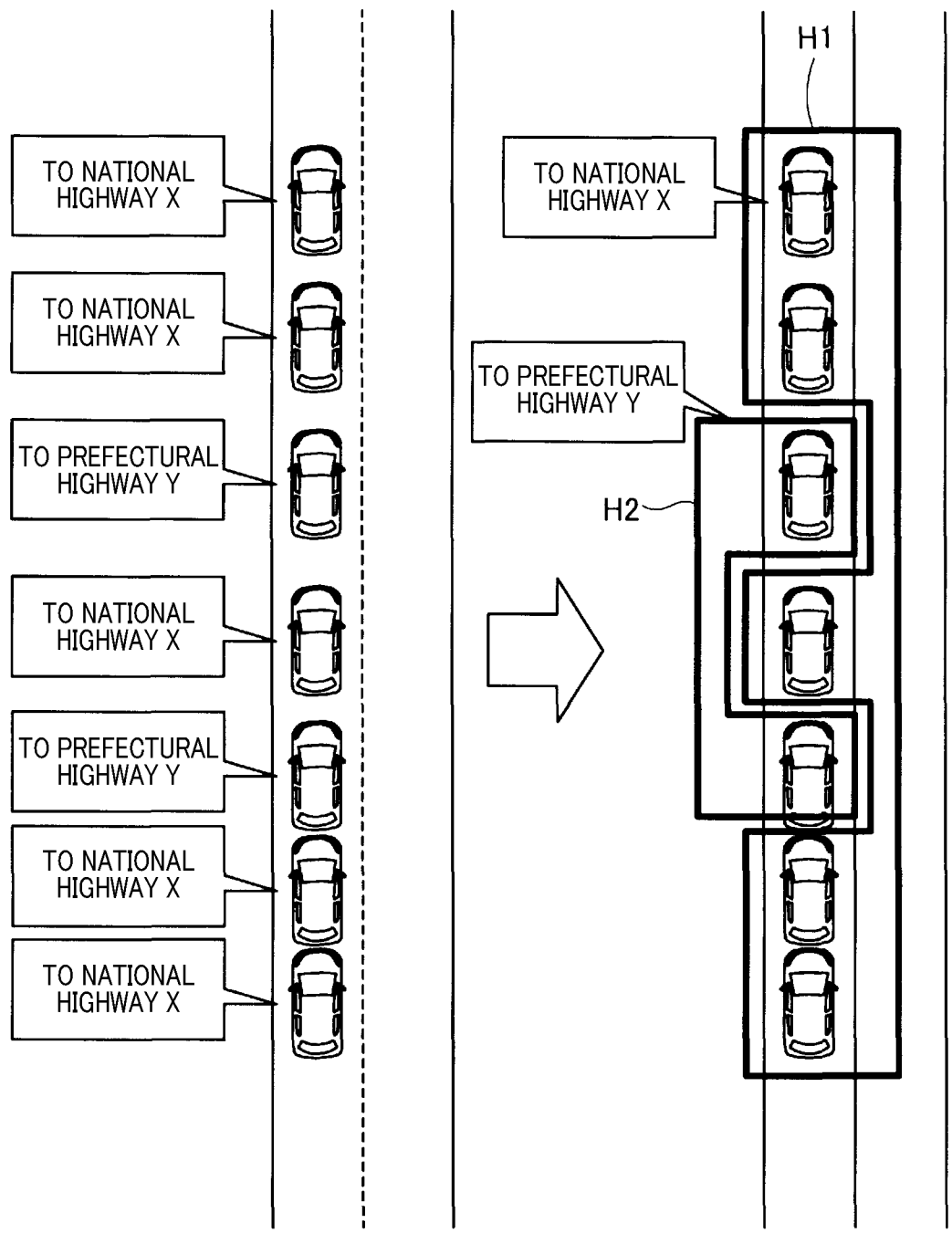
FIG. 20 is a diagram for describing a method for setting a moving body group different from the moving body group in the above-described embodiment.

Additionally, the "destinations that are identical to the destination of the own moving body MC" may include the case that the same route as that through which the own moving body MC is to pass to reach the destination. As illustrated in FIG. 20, the moving body group is set as a moving body group H1 including moving bodies heading for national highway X. and a moving body group H2 including moving bodies heading for Prefectural Highway Y.

Additionally, the "destinations that are identical to the destination of the own moving body MC" may include the case that, for example, the direction from the current location to the destination of the another moving body being within ±10° from the direction from the current location to the destination of the own moving body MC. This allows moving bodies with identical part-routes to be included in the same moving body group even in a case where the destination of the own moving body is far from the destinations of the other moving bodies. This enables a reduction in the number of moving bodies deviating from the moving body group.

C2. Other Embodiment 2

Figure 21:
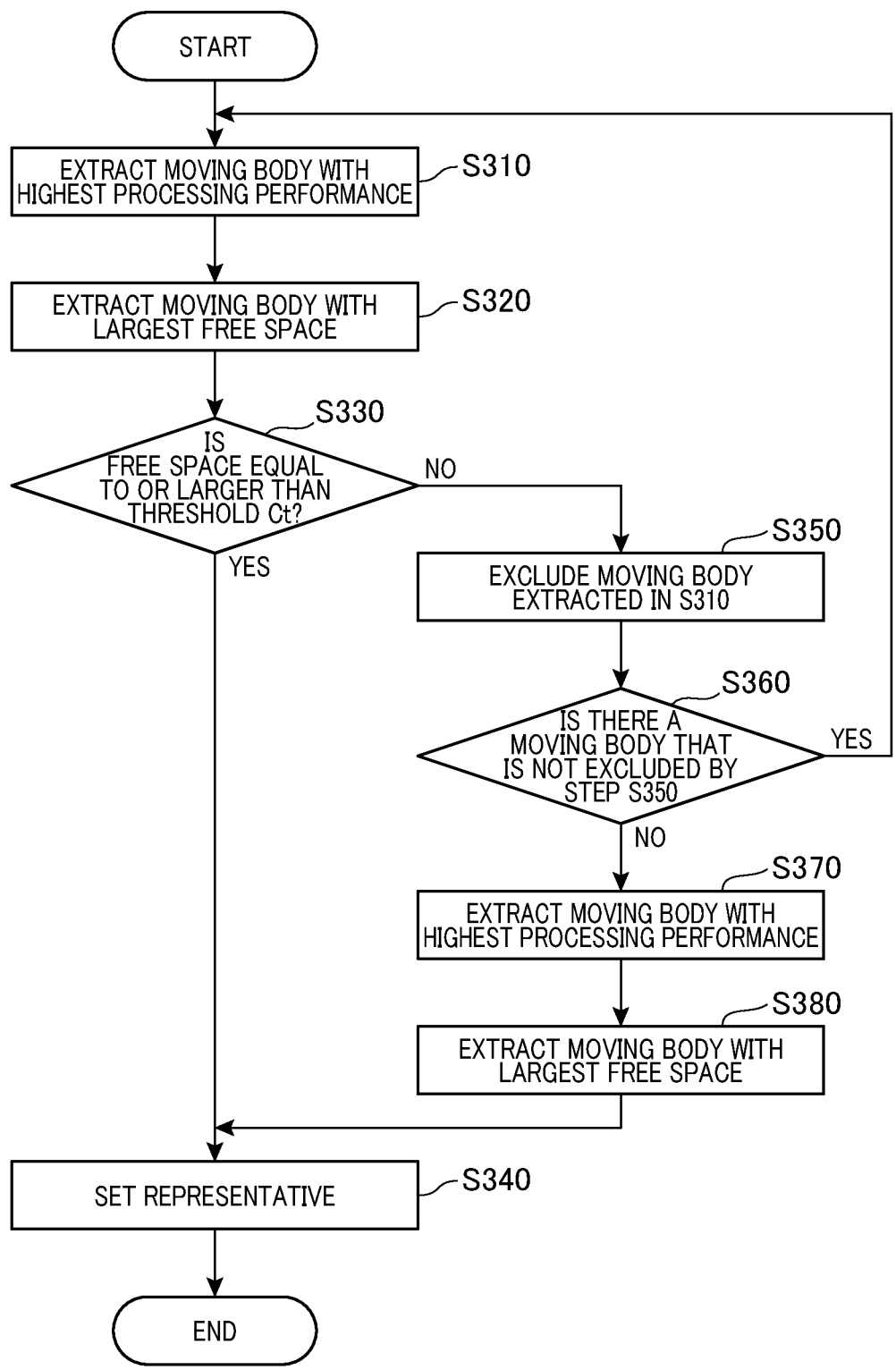
FIG. 21 is a diagram illustrating a flowchart of representative setting processing different from the representative setting processing in the above-described embodiment.

In the embodiments described above, the moving body having a high excess processing capability includes the one having the highest processing performance of the CPU constituting the moving body control unit 110 of the moving body and having the largest free space in the memory constituting the moving body control unit 110. However, no such limitation is intended. For example, a method illustrated in FIG. 21 may be used to select a moving body with a high excess processing capability.

Specifically, first, the communication device 100 extracts moving bodies having the highest processing performance of the CPU constituting the moving body control unit 110 of the moving body (step S310). Subsequently, the communication device 100, from the moving bodies extracted in step S310, extracts the moving body having the largest free space in the memories constituting the moving body control unit 110 (step S320). Then, the communication device 100 determines whether the free space in the memories of the moving body is equal to or larger than a predetermined threshold Ct (for example, 10% of all the memories) (step S330). In a case where the free space in the memories of the moving body is equal to or larger than the predetermined threshold Ct (step S330: YES), the communication device 100 sets the moving body as a representative moving body (step S340), and the process ends.

On the other hand, in a case where the free space in the memories of the moving body is smaller than the predetermined threshold Ct (step S330: NO), the communication device 100 excludes the moving bodies extracted in step S310 (step S350). Then, in a case where there is a moving body that is not excluded by step S350 (step S360: YES), the communication device 100 returns to step S310. In other words, the communication device 100 excludes the moving body with the highest processing performance, and in step S310, extracts the moving body with the highest processing performance from the moving bodies remaining as a result of the exclusion. On the other hand, in a case where no moving body remains (step S360: NO), the communication device 100 extracts the moving body having the highest processing performance of the CPU constituting the moving body control unit 110 of the moving body (step S370), and then the communication device 100 extracts, from the moving bodies extracted in step S370, the moving body having the largest free space in the memories constituting the moving body control unit 110 (step S380). Then, the communication device 100 sets the moving body extracted by S380 as a representative moving body (S340). Thus, in a case where the moving body group includes a moving body which memories with a free space equal to or larger than the threshold Ct, the moving body having the highest processing performance of the CPU can be set as a representative moving body.

C3. Other Embodiment 3

Figure 22:
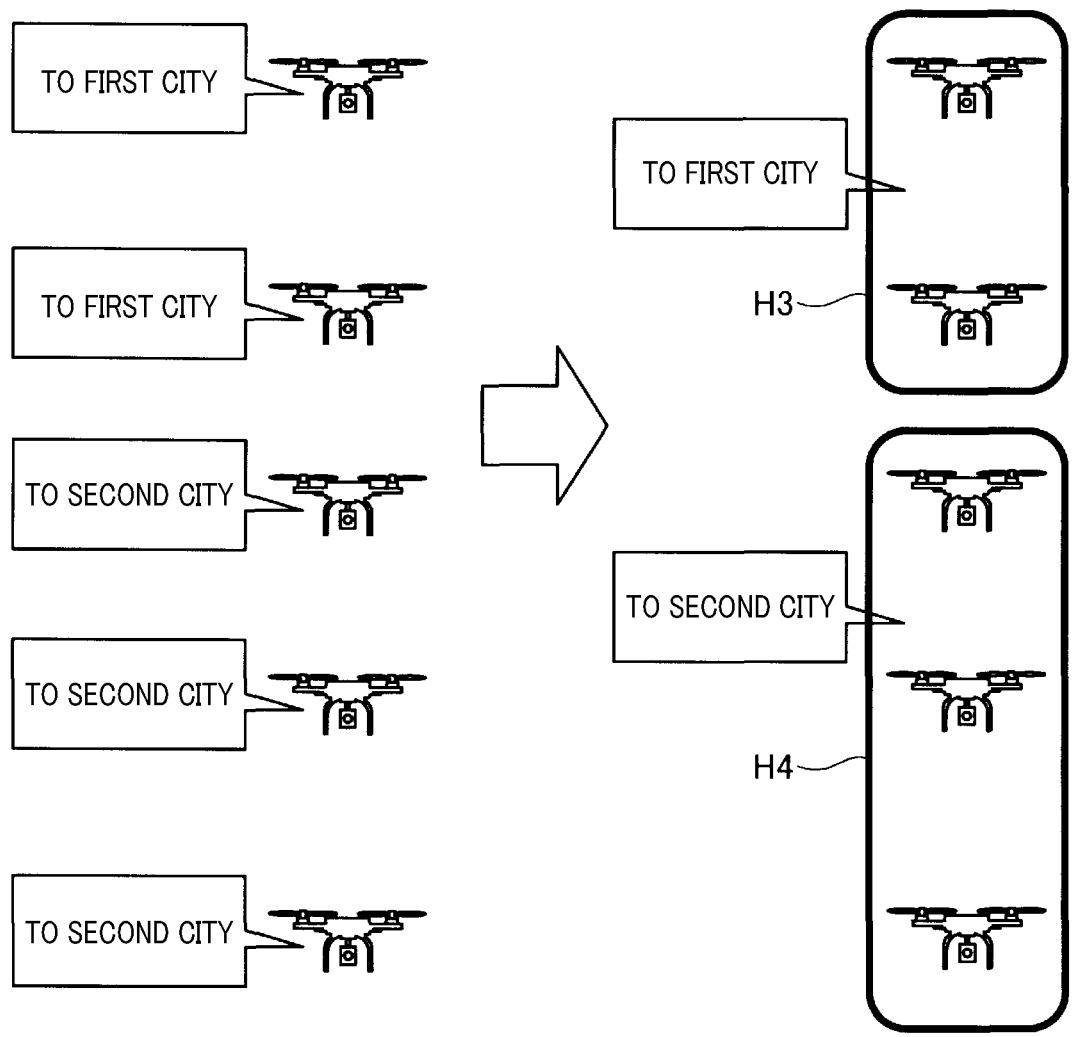
FIG. 22 is a diagram for describing an example using a moving body group different from the moving body group in the above-described embodiment.

In the embodiments described above, vehicles are used as moving bodies. However, as illustrated in FIG. 22, drones may be used as moving bodies. Additionally, as illustrated in FIG. 22, the "destinations that are identical to the destination of the own moving body MC" may correspond to the destination included in the same municipality as that in which the destination of the subject moving body MC is included. In FIG. 22, the moving body group is set as a moving body group H3 including moving bodies heading for a first City and a moving body group H2 including moving bodies heading for a second City.

In each of the embodiments described above, a part of the configuration implemented by hardware may be replaced with software. At least a part of the configuration implemented by software can be implemented by a discrete circuit configuration. Additionally, in a case where some or all of the functions of the present disclosure are implemented by software, the software (computer program) can be provided in a form in which the software is stored in a computer readable recording medium. The "computer readable recording medium" includes internal storage devices in a computer such as various RAMs and ROMs and an external storage device fixed to a computer such as a hard disk, as well as portable recoding media such as flexible disks and CD-ROMs. In other words, the "computer readable recording medium" has a broad meaning that the computer readable recording medium includes any recording medium in which data packets can be non-temporarily stored.

The present disclosure is not limited to the embodiments described above and can be implemented in various configurations without departing from the spirits of the present disclosure. For example, technical features in the embodiments corresponding to technical features in forms described in Summary of the Invention can be replaced or combined with one another as appropriate in order to solve some or all of the above-described problems or to achieve some or all of the above-described effects. Additionally, in a case where the technical feature is not described herein as essential, the technical feature can be deleted as appropriate.

What is claimed is:

1. A movement space information processing system comprising:
    a plurality of moving bodies movable in a space; and
    an information processing device configured to exchange information with each moving body to thereby create spatial information including information related to the space,
    each moving body comprising:
        a first communication unit configured to communicate with the information processing device to exchange a moving-body information item with the information processing device, the moving-body information item including position information regarding a position of the corresponding moving body in the space;
        an image acquisition unit configured to acquire an image of the space; and
        a control unit configured to:
            extract, from the image, probe information related to the space in response to being set as at least one representative moving body by the information processing device; and
            transmit, to the information processing device, the moving-body information item including the probe information,
    the information processing device comprising:
        a second communication unit configured to perform communications with each moving body;
        a moving body determination unit configured to:
            acquire the moving-body information items transmitted from the respective moving bodies using the communications via the second communication unit; and
            analyze the position information included in each of the moving-body information items to thereby determine, from the moving bodies, one or more moving bodies that are movably located within a predetermined movement range in the space;
        an identification unit configured to perform an identification task of identifying, from the determined one or more moving bodies, at least one moving body to accordingly perform a setting task of setting the identified at least one moving body as the at least one representative moving body; and
        a development unit configured to:
            receive the probe information transmitted from the at least one representative moving body; and
            perform development of the spatial information based on the probe information,
    the identification unit being configured to:
        determine, based on a degree of the development of a content of the spatial information related to the movement range, a representative moving-body ratio of the number of the at least one moving body identified as the at least one representative moving body to a total number of the determined one or more moving bodies that are movably located within the predetermined movement range.

2. The movement space information processing device according to claim 1, wherein:
    the identification unit is configured to:
        perform the identification task of identifying, from the determined one or more moving bodies, the at least one moving body with which the identification unit is communicable as the at least one representative moving body in response to determination that at least part of the content of the spatial information related to the movement range has not been developed;
        perform the identification task of identifying, from the determined one or more moving bodies, the at least one moving body to thereby set the representative moving-body ratio to a predetermined ratio in response to determination that an accuracy of the at least part of the content of the spatial information related to the movement range is lower than a first threshold; and
        perform the identification task of identifying, from the determined one or more moving bodies, the at least one moving body to thereby set the number of the at least one moving body identified as the at least one representative moving body to 1 in response to determination that the accuracy of the at least part of the content of the spatial information related to the movement range is higher than or equal to a second threshold that is set to be higher than the first threshold.

3. The movement space information processing device according to claim 1, wherein:
    the determined one or more moving bodies that are movably located within the predetermined movement range comprise a first movable body and a second movable body; and
    the identification unit of the information processing device is configured to:

set a probability of the first moving body being selected as the at least one representative moving body to be higher than that of the second moving body being selected as the at least one representative moving body upon a first condition being satisfied, the first condition representing that the first moving body has a higher capability of extracting the probe information from the image acquired by the image acquisition unit than that of the second moving body; and set the probability of the first moving body being selected as the at least one representative moving body to be higher than that of the second moving body being selected as the at least one representative moving body upon a second condition being satisfied, the second condition representing that an accuracy of the position information regarding the first moving body is higher than that of the position information regarding the second moving body.

4. The movement space information processing device according to claim 3, wherein:

the identification unit of the information processing device is configured to perform determination of whether the first condition is satisfied in priority to determination of whether the second condition is satisfied.

5. The movement space information processing device according to claim 1, wherein:

the one or more moving bodies that are movably located within the predetermined movement range comprise a plurality of moving bodies; and the identification unit, which has performed the identification task of identifying, from the one or more moving bodies that are movably located within the predetermined movement range, the at least one moving body as the at least one representative moving body, is configured to perform the identification task again in response to determination that a configuration of the moving bodies that are movably located within the predetermined movement range has been changed.

6. The movement space information processing device according to claim 1, wherein:

the probe information from each moving body upon the corresponding moving body being set as the at least one representative moving body includes the position information about the corresponding moving body, and includes at least one of:

information regarding at least one planimetric feature located in the space in which the corresponding moving body is movably located; and moving range limitation information indicating information related to a movable range of the corresponding moving body in the space.

7. The movement space information processing device according to claim 6, wherein:

each moving body is a vehicle that is travelable on a road surface;

the at least one planimetric feature included in the probe information includes at least one of an above-ground billboard, an above-ground traffic light, an above-ground road sign, an above-ground pole, an above-ground stop line, and an above-ground crosswalk; and the moving range limitation information includes at least one of an above-grounded solid line, an above-ground dashed line, above-ground Botts Dots, and above-ground road edge.

8. The movement space information processing device according to claim 6, wherein:

each moving body is a drone movable in air;

the at least one planimetric feature included in the probe information includes at least one of a building protruding from ground into the air, a steel tower, a utility pole, an electric wire, a billboard, and a traffic light; and the moving range limitation information includes at least a guidance light indicating a flight path.

9. The movement space information processing device according to claim 6, wherein:

each moving body is a ship moving on a water surface;

the at least one planimetric feature included in the probe information includes at least one of a billboard, a bridge, a lighthouse, a sign, and a reef; and the moving range limitation information includes at least one of a coastline, revetment, and a pier.

10. A movement space information processing method of exchanging information with moving bodies movable in a space to thereby create spatial information including information related to the space, each moving body transmitting moving-body information item including at least position information regarding a position of the corresponding moving body, the method comprising:

acquiring the moving-body information items transmitted from the respective moving bodies using communications therewith;

analyzing the position information included in each of the moving-body information items to thereby determine, from the moving bodies, one or more moving bodies that are movably located within a predetermined movement range in the space;

identifying, from the determined one or more moving bodies, at least one moving body to accordingly perform a setting task of setting the identified at least one moving body as at least one representative moving body;

receiving, from the at least one moving body being set as the at least one representative moving body, the moving-body information item including probe information, the probe information being related to the space and extracted by the at least one representative moving body from an image of the space;

performing development of the spatial information based on the received probe information; and determining, based on a degree of the development of a content of the spatial information related to the movement range, a representative moving-body ratio of the number of the at least one moving body identified as the at least one representative moving body to a total number of the determined one or more moving bodies that are movably located within the predetermined movement range.

11. A communication device to be mounted to an own moving body, the communication device comprising:

a self-information item acquisition unit configured to acquire a self-information item including a destination of the own moving body;

an other-body information acquisition unit configured to acquire an other-body information item from each of other moving bodies located around the own moving body, the other-body information item of each of the other moving bodies including a destination of a corresponding one of the other moving bodies;

a moving-body group setting unit configured to:
  use the self-information item and the other-body information item to select, from the other moving bodies, at least one other moving body with the destination that is identical to the destination of the own moving body; and
  combine the own moving body and the selected at least one other moving body with each other into a group;
a representative setting unit configured to set one of the own moving body and the selected at least one other moving body in the group as a representative moving body; and
a transmission unit configured to transmit, to a base station, information regarding the own moving object and the at least one other moving object in the group in response to the own moving object being set as the representative moving body.

12. The communication device according to claim 11, wherein:
  the own moving body has an information-processing capability of processing the self-information item and the other-information items;
  each of the other moving objects comprises the self-information item acquisition unit and the other-body information acquisition unit, and has an information-processing capability of processing the self-information item and the other-information items; and
  the representative setting unit is configured to set one of the own moving body and the selected at least one other moving body in the group as the representative moving body in accordance with comparison between the information-processing capability of the own moving body and that of the at least one other moving body.

13. The communication device according to claim 12, wherein:
  each of the own moving body and the other moving bodies has an excess processing capability; and
  the representative setting unit is configured to set one of the corresponding moving body and the selected at least one other moving body in the group as the representative moving body, the excess processing capability of the one of the corresponding moving body and the selected at least one other moving body in the group being highest in the group.

14. The communication device according to claim 11, wherein:
  the moving body group setting unit is configured to use the self-information item and the other-body information item to thereby determine that the destination of the at least one other moving body is identical to the destination of the own moving body in response to determination that a first point where the own moving object will reach after lapse of a predetermined time and a second point where the at least one other moving body will reach after lapse of the predetermined time are located within a predetermined range.

\* \* \* \* \*